United States Patent [19]

Weyermann et al.

[11] Patent Number: 5,234,094

[45] Date of Patent: Aug. 10, 1993

[54] FLEXIBLE FEEDER CONVEYOR SYSTEM

[75] Inventors: Gary L. Weyermann, Missoula, Mont.; Don Suverkrop, Bakersfield, Calif.

[73] Assignee: Felco Industries, Ltd., Missoula, Mont.

[21] Appl. No.: 881,885

[22] Filed: May 12, 1992

[51] Int. Cl.$^5$ ............................................. B65G 65/02
[52] U.S. Cl. .................................... 198/303; 198/311; 198/588; 198/589; 198/517; 198/560
[58] Field of Search ............... 198/588, 589, 517, 535, 198/544, 546, 547, 560, 563, 566, 567, 303, 308.1, 311

[56] References Cited

U.S. PATENT DOCUMENTS

| | | |
|---|---|---|
| Re. 26,298 | 11/1967 | Oury et al. . |
| 1,078,255 | 11/1913 | Cartmill . |
| 1,621,694 | 3/1927 | Tracy . |
| 2,479,823 | 8/1949 | Ernst . |
| 2,684,750 | 7/1954 | Mercier .................... 198/589 X |
| 2,724,196 | 11/1955 | Lucas . |
| 2,805,758 | 9/1957 | Madeira et al. . |
| 2,923,398 | 2/1960 | Milik . |
| 3,279,584 | 10/1966 | Towles . |
| 3,393,791 | 7/1968 | Heitzer ...................... 198/535 X |
| 3,499,522 | 3/1970 | Novak . |
| 3,744,615 | 7/1973 | Plaquet et al. ............. 198/311 X |
| 3,767,031 | 10/1973 | Gorgei et al. .............. 198/560 X |
| 3,885,682 | 5/1975 | McWilliams . |
| 4,031,997 | 6/1977 | Nelson . |
| 4,054,213 | 10/1977 | Chever . |
| 4,379,672 | 4/1983 | Hunter . |
| 4,462,747 | 7/1984 | Caplis et al. . |
| 4,571,145 | 2/1986 | Hunter . |
| 4,776,445 | 10/1988 | Zitz et al. . |
| 4,795,264 | 1/1989 | Riker ............................ 198/547 X |
| 4,924,993 | 5/1990 | Buxton ........................... 198/311 |

*Primary Examiner*—D. Glenn Dayoan
*Attorney, Agent, or Firm*—Seed and Berry

[57] ABSTRACT

A flexible feeder conveyor system for removing material from a stockpile and transporting the removed material to a fixed conveyor. The system includes an underconveyor positioned below an excavator and having a loading hopper attached to its forward end to receive material and transport it beneath the excavator a rearward end of the underconveyor. A string of trailing conveyors is towed behind the underconveyor with the last trailing conveyor having its rearward end attached to a stationary terminal support positioned at the fixed conveyor. The underconveyor, the trailing conveyors, and the terminal support are connected together using transition hoppers. Each transition hopper includes an upper hopper mounted to the raised rearward end of the forward conveyor, and a lower hopper mounted to the forward end of the next rearward conveyor. The forward end of the conveyor is rollingly supported by a pair of caster wheels. The upper and lower hoppers are connected together for rotation through both a horizontal plane and a vertical plane. The horizontal rotation is permitted by constructing the upper hopper with an annular support portion and a housing portion rotatably supported thereabove by an annular bearing. The vertical rotation is permitted by a pair of pivot pins attached to the annular support portion which are loosely received within corresponding upwardly opening slots in a housing portion of the lower hopper to permit the upper hopper to pivot with respect to the lower hopper.

48 Claims, 13 Drawing Sheets

FLEXIBLE FEEDER CONVEYOR SYSTEM

TECHNICAL FIELD

The present invention relates generally to conveyors, and more particularly, to a flexible feeder conveyor system used to transfer bulk materials from one place to another at high speed.

BACKGROUND OF THE INVENTION

Stockpiled materials, such as ore concentrate, are frequently stored in dockside storage buildings which are equipped with a fixed conveyor positioned to convey the material to a ship or barge. Typically, the bucket of a front-end loader is used to scoop up material and deposit it on the fixed conveyor. As the stockpiled material is removed, the front-end loader must travel farther and farther from the conveyor and the time required to fill the bucket with material, carry the material to the conveyor, dump the material on the conveyor and return to the stockpile increases. The long time required to travel back and forth between the stockpile and the conveyor is undesirable, especially when large volumes of material must be moved. The time in motion results in increased cost of handling, increased wear on the front-end loader, and longer stays for the ship or barge at dockside while waiting to be loaded unless multiple front-end loaders are used. In addition, utilizing a front-end loader, with its limited reach, necessarily exposes the operator to a safety hazard in that excavating along the lower part of the stockpile creates overhanging material which eventually caves and sloughs, endangering both the operator and the loader.

It will therefore be appreciated that there has been a significant need for a feeder system which reduces the time required to load stockpiled material without increasing the cost of handling while performing such operations in a safer manner. Any such feeder system should be easily and quickly modified to accommodate the particular distance between the stockpile and the fixed conveyor resulting not only from significant changes in the distance between the stockpile and the conveyor as the stockpile is removed, but also resulting when the feeder system is moved to another dockside storage building or site where the distance between the stockpile and the fixed conveyor is of significantly increased or decreased length. Further, the feeder system should be operable at a high level of production while requiring fewer personnel than presently used in the industry for removing stockpiled material and transporting it to a ship or barge. The feeder system should also be usable when handling other types of bulk material besides ore concentrate, and in other situations besides dockside stockpiles. The feeder system should improve safety by removing stockpiled materials at a sufficient height and distance to insure that caving and sloughing will pose no threat to the operator and feeder system.

The present invention fulfills these needs, and further provides other related advantages.

SUMMARY OF THE INVENTION

The present invention resides in a flexible feeder conveyor system for removing material and transporting the removed material to a distant location. The system includes a mobile vehicle, a material handling member attached to the vehicle to move the material toward the forward end of the vehicle, and a first conveyor carried by the vehicle for travel therewith. The first conveyor extends in an upward incline from a forward end at a forward end of the vehicle to an elevated rearward end.

A conveyor loader is attached to the first conveyor forward end to receive the material being moved using the material handling member. The conveyor loader deposits the material received therein on the first conveyor for transport to the first conveyor rearward end. A terminal support member is positioned to remain at the distant location where the removed material is to be deposited as the vehicle moves about. A string of at least two trailing conveyors extends between the rearward end of the first conveyor and the terminal support member. Each trailing conveyor extends at an upward incline from a forward end to an elevated rearward end. The forward end of each trailing conveyor is rollingly supported by at least one wheel for travel as the vehicle moves about.

The system further includes a plurality of transition hoppers, one connected to the first conveyor to the forwardmost one of the trailing conveyors, one connecting the rearwardmost one of the trailing conveyors to the terminal support, and one connecting together each of the trailing conveyors to the next rearward one of the trailing conveyors. Each of the transition hoppers has an upper hopper mounted above and secured to a lower hopper. One of the upper hoppers is mounted to the first conveyor at the first conveyor rearward end and one is mounted to each of the trailing conveyors at the trailing conveyor rearward end. One of the lower hoppers is mounted to each of the trailing conveyors at the trailing conveyor forward end and one is mounted to the terminal support member. The upper hopper of the first conveyor is positioned to receive material transported on the first conveyor, and the upper hopper of each of the trailing conveyors is positioned to receive material transported on the trailing conveyor to which mounted.

Each of the upper hoppers has a support portion with a central aperture and a pair of pivot pins attached thereto. The pivot pins extend outward from the opposing sides of the support portion. The upper hopper also has a first housing portion rotatably supported by the support portion for rotation relative thereto through a generally horizontal plane. The first housing portion includes a first receiving opening into which the corresponding one of the first conveyor or the trailing conveyor to which mounted deposits the material being transported thereon. The first housing portion also includes a first receiver portion extending downwardly within the central aperture of the support portion and receiving the material received through the receiver opening. The first receiver portion terminates in a first exit opening through which the material entering the first receiving opening exits from the first housing portion.

Each of the lower hoppers has a second housing portion and a pair of receivers supported by the second housing portion. The receivers are located at opposing sides of the second housing portion to pivotally receive a corresponding one of the pivot pins of the upper hopper positioned thereabove for rotation of the upper hopper relative to the lower hopper through a generally vertical plane. The second housing portion includes a second receiver portion receiving the material exiting from the first exit opening of the first receiver portion, and a second exit opening through which the material received by the second receiver portion exits from the second housing portion and is deposited on the corresponding one of the trailing conveyors to which mounted for transport rearward along the trailing conveyor to one of the upper hoppers mounted to the immediately rearward one of the trailing conveyor or at the distant location. The interconnection of the corresponding ones of the upper and lower hoppers transmits the towing force on the vehicle from the upper conveyor through the string of trailing conveyors to tow the string of trailing conveyors behind the first conveyor as the vehicle moves about.

In the illustrated embodiment of the invention, the mobile vehicle is an excavator, and the material handling member is a backhoe arm mounted to the excavator. The first conveyor in the illustrated embodiment of the invention is an underconveyor positioned beneath and pivotally attached to the excavator for rotation through a vertical plane to permit the loading hopper to be raised or lowered relative to the ground surface. The first housing portion includes a deflector deflecting downward the material received through the receiving opening. The deflector is selectively adjustable to control the direction of flow of the material engaging the deflector.

The receivers of the second housing are upwardly open slots formed in the second housing portion, with each slot being sized to loosely receive one of the pivot pins therein to permit the pivot pin to rotate within the slot, thereby providing limited vertical movement. The slots are substantially vertically oriented. Each of the slots is provided with a selectively removable retainer pin which, when in place, locks the one of the pivot pins within the slot to prevent removal therefrom during usage of the feeder conveyor system.

Other features and advantages of the invention will become apparent from the following detailed description, taken in conjunction with the accompanying drawings.

DETAILED DESCRIPTION OF THE INVENTION

Figure 1:
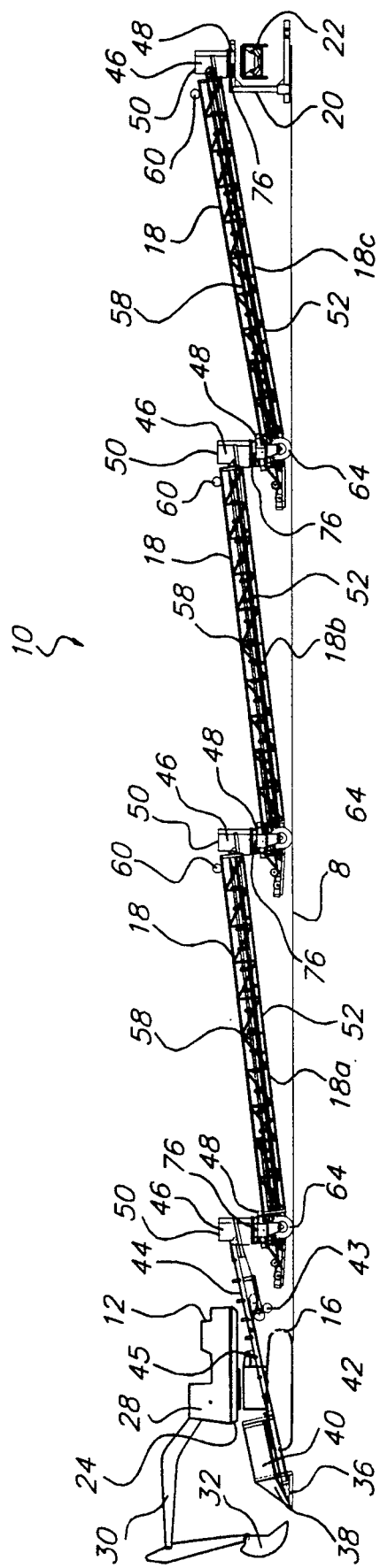
FIG. 1 is a side elevational view of a flexible feeder conveyor system embodying the present invention which supplies material to a fixed conveyor.

As shown in the drawings for purposes of illustration, the present invention is embodied in a flexible feeder conveyor system, indicated generally by the reference numeral 10. The embodiment of the feeder system 10 shown in FIG. 1 includes a conventional self-propelled excavator 12, an underconveyor 14 extending between a pair of left and right endless excavator crawler tracks 16, three trailing conveyors 18 and a stationary terminal support 20. The three trailing conveyors 18 are connected together in a string between the underconveyor 14 and the terminal support 20 for towing behind the excavator 12. The trailing conveyors 18 include a first trailing conveyor 18a attached to the rearward end of the underconveyor 14, a second trailing conveyor 18b attached to the rearward end of the first trailing conveyor and a third trailing conveyor 18c attached to the rearward end of the second trailing conveyor. The stationary terminal support 20 is attached to the rearward end of the third trailing conveyor 18c and anchors it against lateral movement.

Material picked up by the underconveyor 14 is transported sequentially along the three trailing conveyors 18 and discharged at the terminal support 20. The terminal support 20 is positioned at a conventional fixed conveyor 22 which receives and transports away any materials supplied to it by the feeder system 10. The fixed conveyor 22 may lead to a ship or barge, or any other location at which the material being removed by the feeder system 10 is to be deposited. While the feeder system 10 of the present invention is particularly useful in removing stockpiled materials, such as ore concentrate, from inside a dockside storage building such as shown in FIG. 4, the feeder system may be used in many situations to remove a variety of materials.

Figure 5:
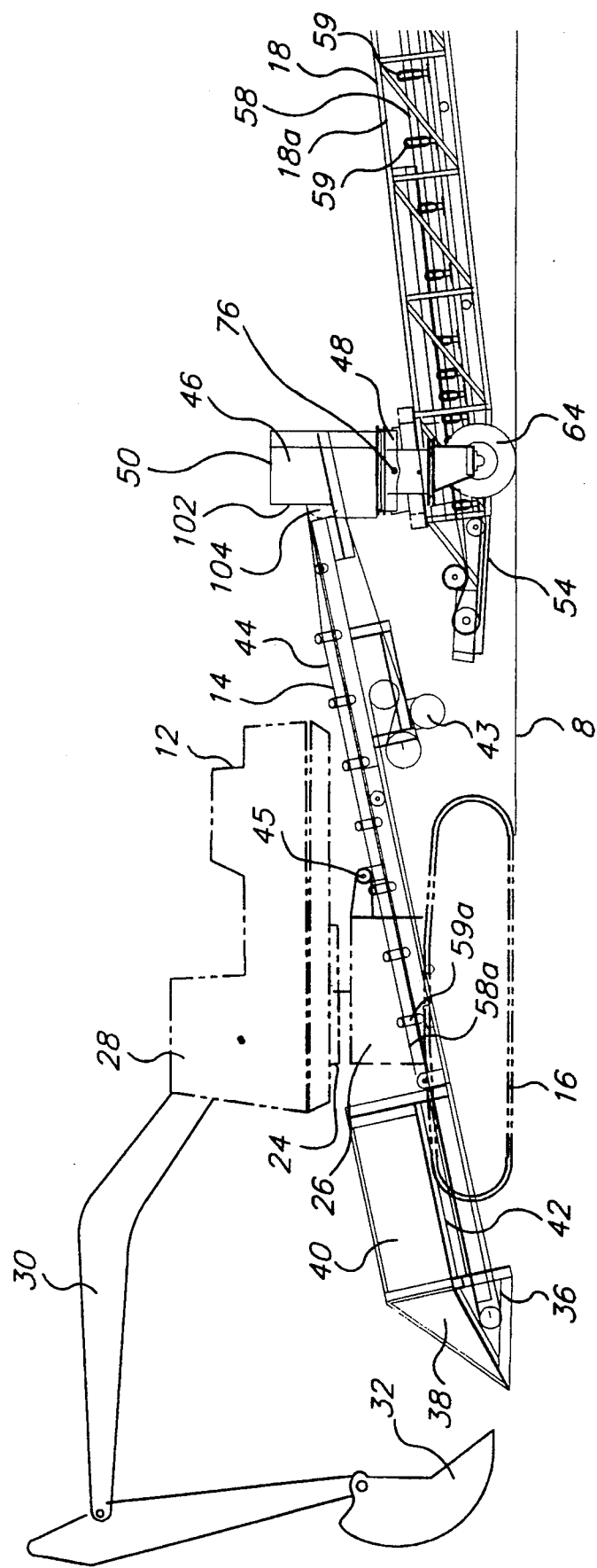
FIG. 5 is an enlarged, side elevational view of the excavator, loading hopper, underconveyor, and a portion of the first trailing conveyor of FIG. 1.

As best shown in FIGS. 1 and 5, the excavator 12 includes a platform 24 which is rotatably mounted upon an excavator undercarriage 26, with the excavator undercarriage being supported by the crawler tracks 16. The rotatable platform 24 supports a cab 28 and an articulated boom 30. The boom 30 has a bucket 32 pivotally secured at the free end of the boom in the manner of a backhoe. It is noted that, while a "bucket" is described herein, any attachments designed to blade, scoop, pull, excavate or extract stockpiled materials may be used.

Figure 2:
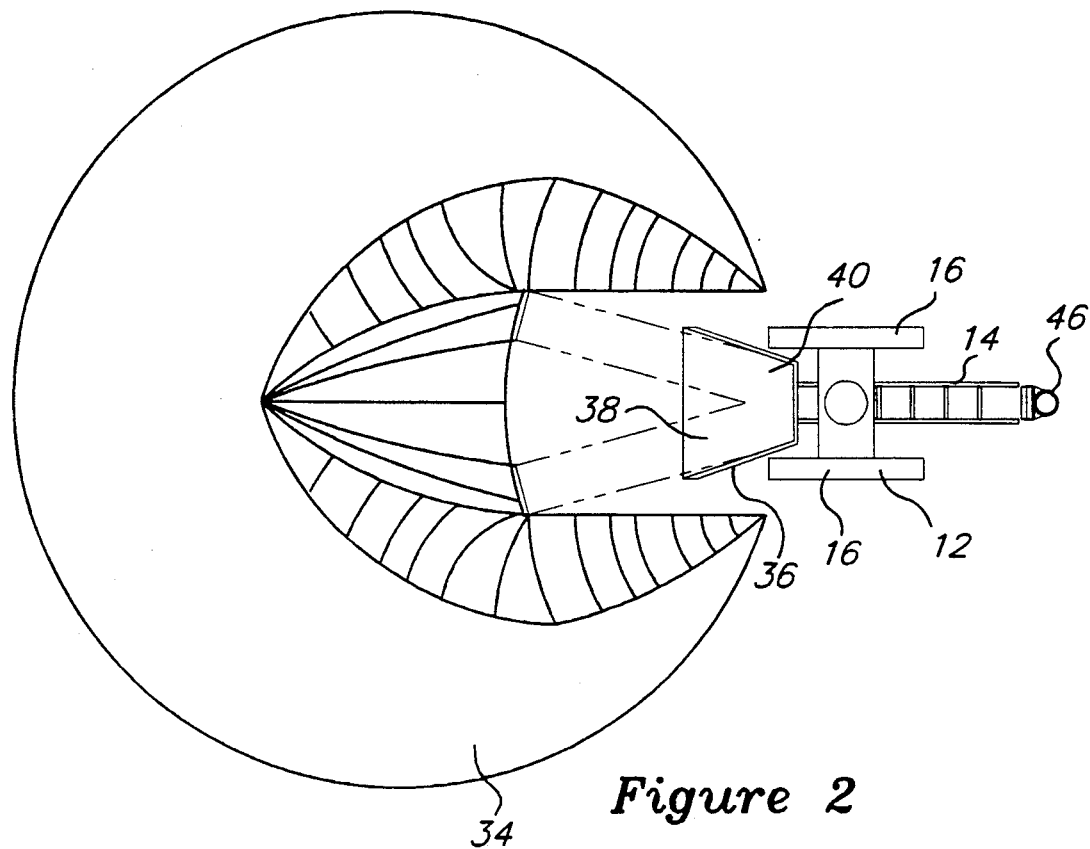
FIG. 2 is a reduced scale top plan view of the excavator of FIG. 1 showing the operating reach of the excavation's bucket when removing material from a stockpile, with portions of the excavator removed for purposes of illustration.
Figure 3:
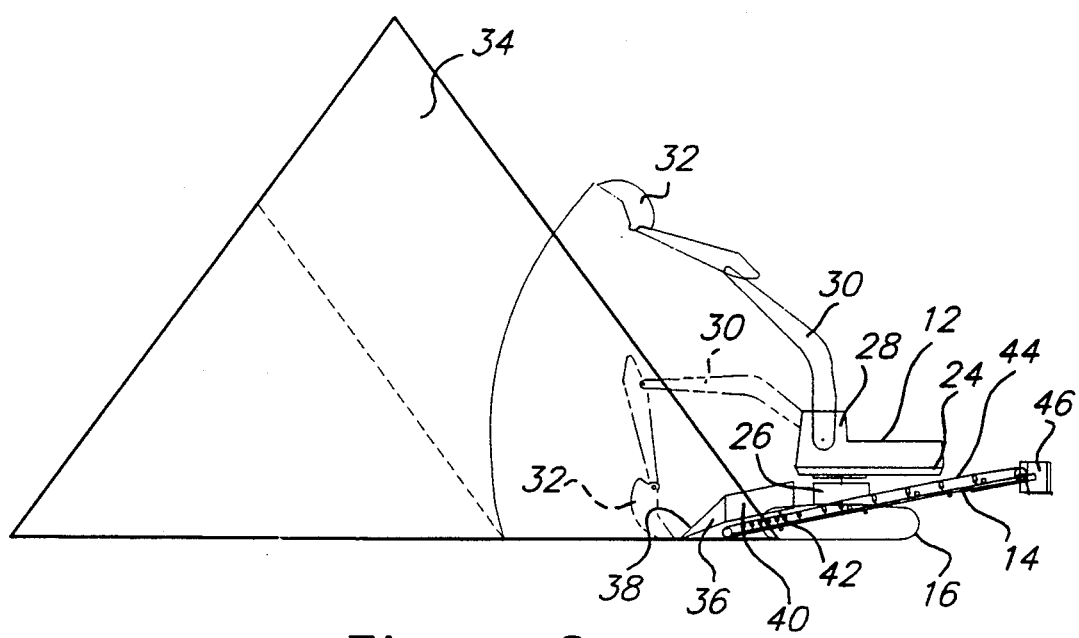
FIG. 3 is a side elevational view of the excavator of FIG. 2 also showing the reach of the bucket.

The excavator 12 has a significant reach with its boom 30 and bucket 32 for picking up bucketloads of a material (illustrated as being in a conical stockpile 34) or for pulling material toward the underconveyor 14, as illustrated in FIGS. 2 and 3, thereby removing stockpiled material at a safe distance from the operator. Nevertheless, the excavator 12 must be regularly moved about as the stockpile 34 is removed so as to have access to additional portions of the stockpile and also to pickup the material with the underconveyor 14 as will now be described. The underconveyor 14 has a scooping bin or loading hopper 36 mounted at its forward end which is positioned under the excavator platform 24 and in front of the excavator undercarriage 26, at a position where the boom 30 can be manipulated to use the bucket 32 to pull material from the stockpile 34 toward the underconveyor 14 and also to drop material carried by the bucket directly into the loading hopper 36.

FIG. 2 shows a top plan view of the loading hopper 36 with portions of the excavator 12 removed for purposes of illustration. The loading hopper 36 has a forwardly open fan-shaped entry portion 38 for receiving material deposited by the excavator 12 as the excavator moves forward. The material received by the entry portion 38 is pushed rearward within the loading hopper 36 as the excavator moves forward and engages additional material. The material in the entry portion 38 passes rearwardly into a transfer portion 40. The transfer portion 40 has elevated side walls and a back wall which direct the material received in the transfer portion 40 into a center opening 42 therein positioned above an endless belt 44 of the underconveyor 14. The material reaching the center opening 42 falls onto the endless belt 44 which is supported by a series of rollers and driven by a motor 43, and the endless belt carries the material rearward under the excavator 12 to the rearward end of the underconveyor 14.

The underconveyor 14 is pivotally attached to the excavator undercarriage 26 by two sets of eye mounts and pivot pins 45, one being positioned to each side of the underconveyor, as shown in FIG. 5 for the left side. With this arrangement, the underconveyor 14 can be pivoted to selectively raise up and lower the loading hopper 36 mounted at the forward end of the underconveyor. This permits the loading hopper 36 to move up and down as it glides or floats over the ground surface 8. Material engaged by the entry portion 38 of the loading hopper 36 will ascend into the loading hopper and be trapped therein as material is scooped into it and as the excavator 12 moves forward into the stockpile 34. The operator of the excavator 12 moves the boom 30 and the bucket 32 to pull material from the stockpile 34 to scoop the material directly into the loading hopper 36.

The excavator 12 is a conventional crawler backhoe suitable as to reach, operating cycle time and bucket capacity. The excavator 12 is also selected with sufficient power and traction to tow the trailing conveyors 18 therebehind as the excavator moves about to excavate material from the stockpile 34 into the loading hopper 36. To accommodate the positioning of the underconveyor 14 beneath the excavator, the excavator undercarriage 26 must be extended so as to raise the excavator platform 24 approximately four feet. This provides sufficient space below the excavator undercarriage 26 for the underconveyor 14 and for its pivotal movement beneath the excavator. The length, incline and discharge height of the underconveyor determine the particular height to which the excavator platform 24 must be raised.

An upper hopper 46 is attached to the rearward end of the underconveyor 14 and each of the three trailing conveyors 18. A lower hopper 48 is attached to the forward end of each of the trailing conveyors 18 and atop the stationary terminal support 20. The lower hopper 48 is positioned below a corresponding one of the upper hopper 46 of the underconveyor 14 or the trailing conveyor 18 and locked together with it as will be described below. The lower hoppers 48 each work in combination with a corresponding one of the upper hoppers 46 to define four transition hoppers 50 which provide for an efficient transfer of the material between the underconveyor 14 and the first trailing conveyor 18a, between the first and second trailing conveyors 18a and 18b, between the second and third trailing conveyors 18b and 18c, and between the third trailing conveyor 18c and the stationary terminal support 20.

Figure 4A:
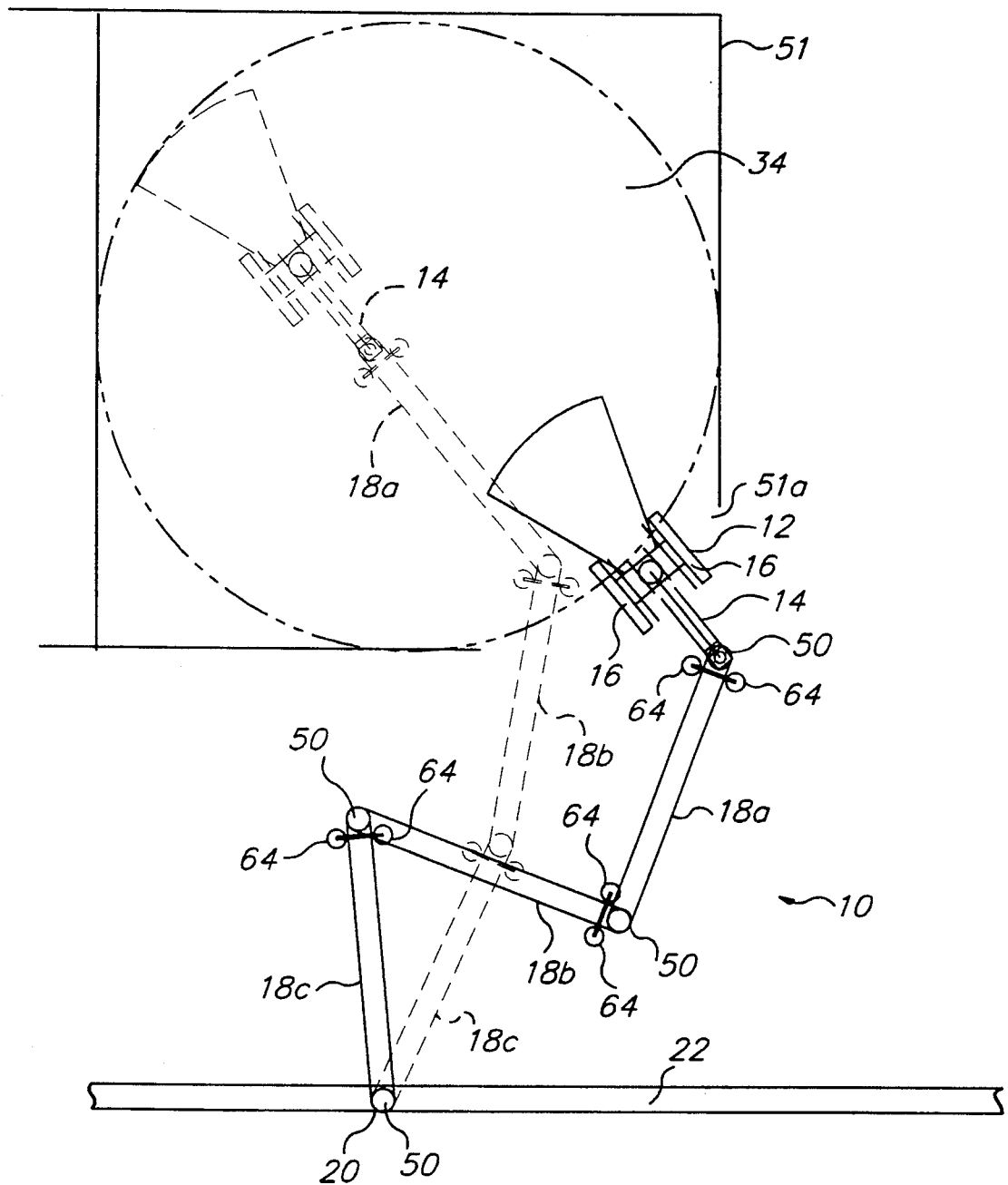
FIG. 4A is a reduced scale top plan view of the feeder system as shown in FIG. 4 schematically showing the trailing conveyors in an extreme scissored position and in a fully extended position.
Figure 4B:
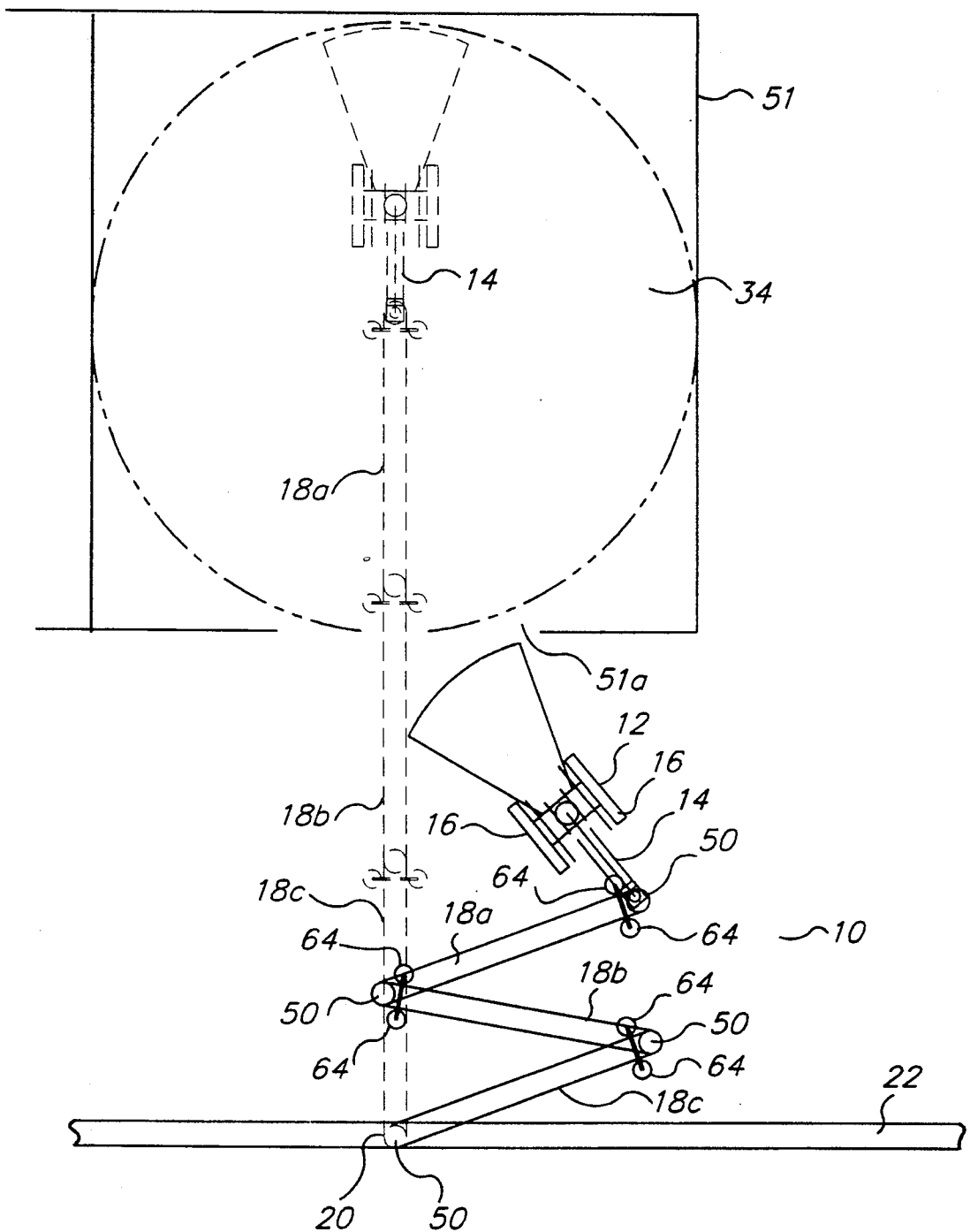
FIG. 4 is a reduced scale top plan view of the feeder system of FIG. 1 schematically showing the excavator and a string of trailing conveyors in two different positions as a result of the excavator being moved about to remove the stockpile.

The feeder system 10 of the present invention is illustrated in operation in FIGS. 4 and 4A with the excavator 12 shown at various locations within a storage room 51 containing the stockpile 34 such as occurs as the material is removed and the excavator is moved about to reach the remaining material within the storage room. Access to the storage room 51 is achieved through a door opening 51a. The feeder system 10 is illustrated in solid line with the excavator at the door opening 51a, and in broken line in a second position to which the excavator 12, underconveyor 14 and the three trailing conveyors 18 have moved to continue removing the stockpile 34. The three trailing conveyors 18 are towed behind the excavator as it moves about within the storage room 51. As will be described in detail below, each of the termination hoppers 50 provides a connection between the underconveyor 14, the trailing conveyors 18 and the terminal support 20 so that the excavator 12 is free to travel about in all lateral directions limited only by the constraints of the working space within the storage room 51, the maximum extent of permissible scissoring movement permitted between conveyors, and the position of the stationary terminal support 20.

With the feeder system 10 of the present invention, the trailing conveyors 18 can operate at full loading capacity and conveyor speed while the excavator 12 moves about and the trailing conveyors move in scissor fashion relative to each other and the underconveyor 14. This allows the feeder system 10 to transfer bulk material from one place to another in a high-speed and continuous manner without the delays encountered when using a front loader or other vehicle which must pick up individual bucketloads of material and transport them to a distant fixed conveyor and then return to the stockpile 34. With the present invention, the excavator 12 can work continuously while the material is being conveyed by the underconveyor 14 and the three trailing conveyors 18 to the terminal support 20 at which the material is deposited on the fixed conveyor 22 for transport away from the site. While the feeder system 10 shown in FIG. 1 includes three trailing conveyors 18, trailing conveyors may be readily added or detached as needed for the size of the work space, as will be described in more detail below.

Figure 7:
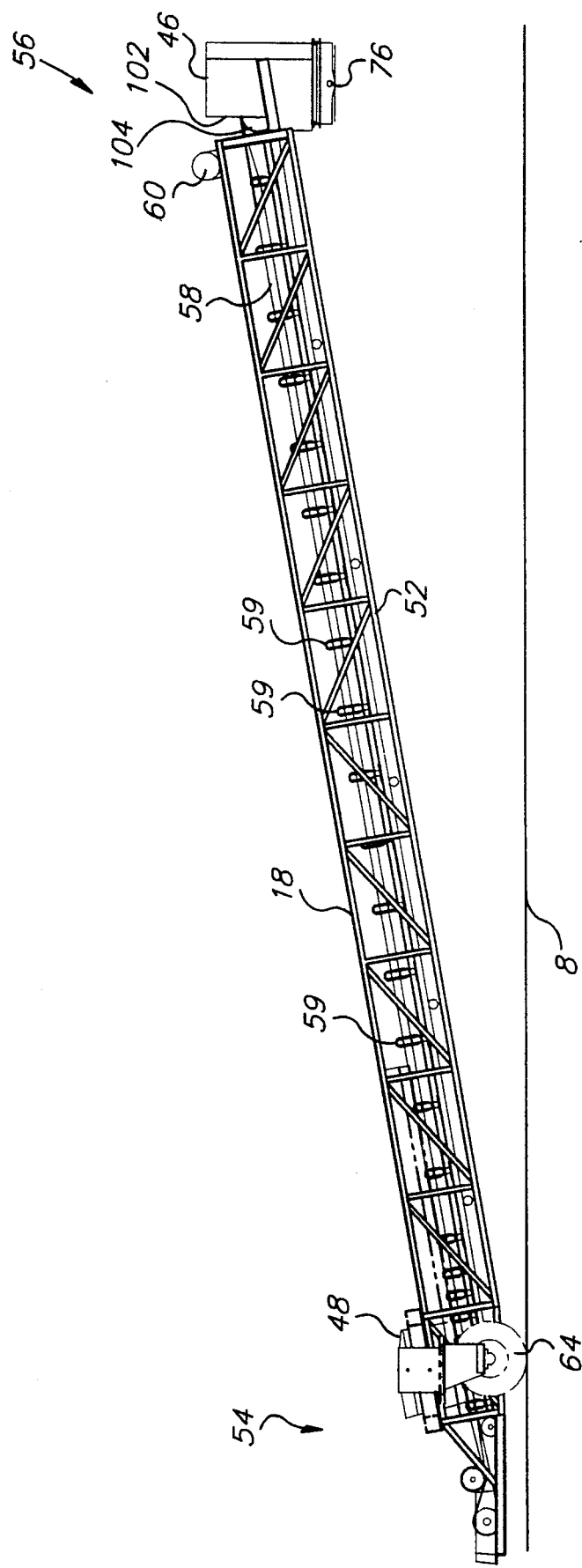
FIG. 7 is an enlarged, side elevational view of one of the trailing conveyors of FIG. 1 disconnected from the string of trailing conveyors.

One of the trailing conveyors 18 is shown in FIG. 7 disconnected from the underconveyor 14, the other trailing conveyors and the terminal support 20. The trailing conveyor 18 has a 60-foot long lattice support frame 52 which extends between a forward end 54 and a rearward end 56 (shown suspended for purposes of illustration). As shown in FIG. 7, during use the trailing conveyor 18 is rearwardly upward inclined and the rearward end 56 is elevated and out of direct contact with the ground surface 8. The support frame 52 carries a conventional endless belt 58 supported by a series of rollers 59 for rearward transport of material deposited thereon. The endless belt 58, supported by rollers 59, is driven by a motor 60 mounted at the forward end 54 of the support frame 52. The underconveyor 14 similarly uses an endless belt 58a supported by rollers 59a.

Figure 6:
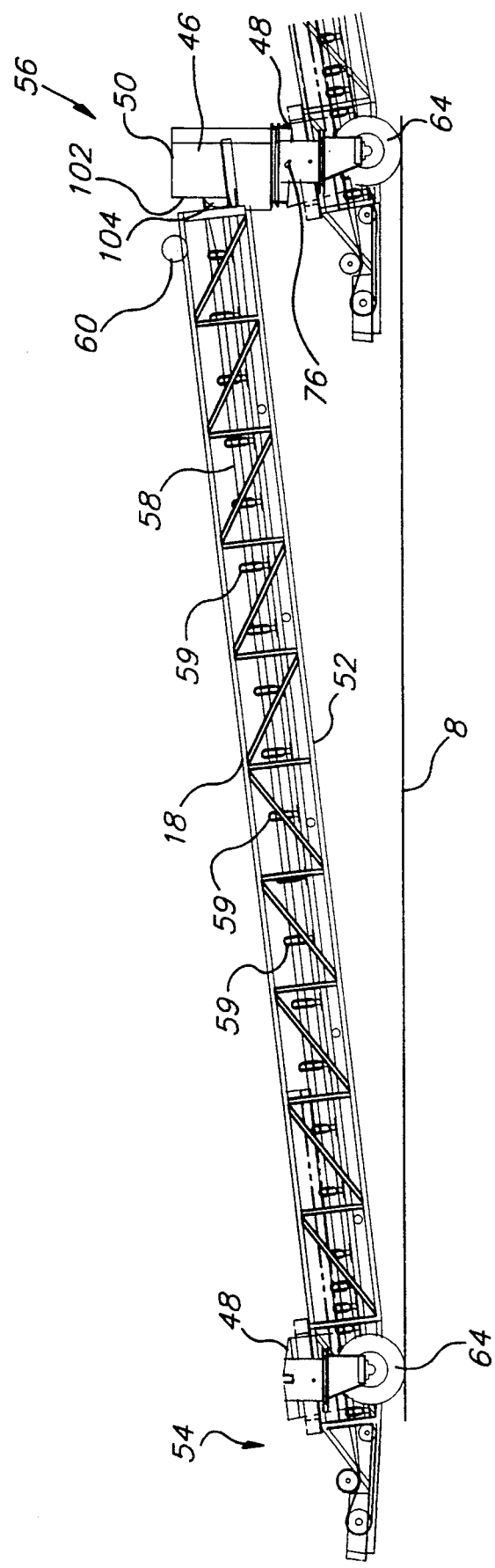
FIG. 6 is an enlarged, side elevational view of the first trailing conveyor and a portion of a second trailing conveyor of FIG. 1 with the first trailing conveyor disconnected from the excavator.
Figure 8:
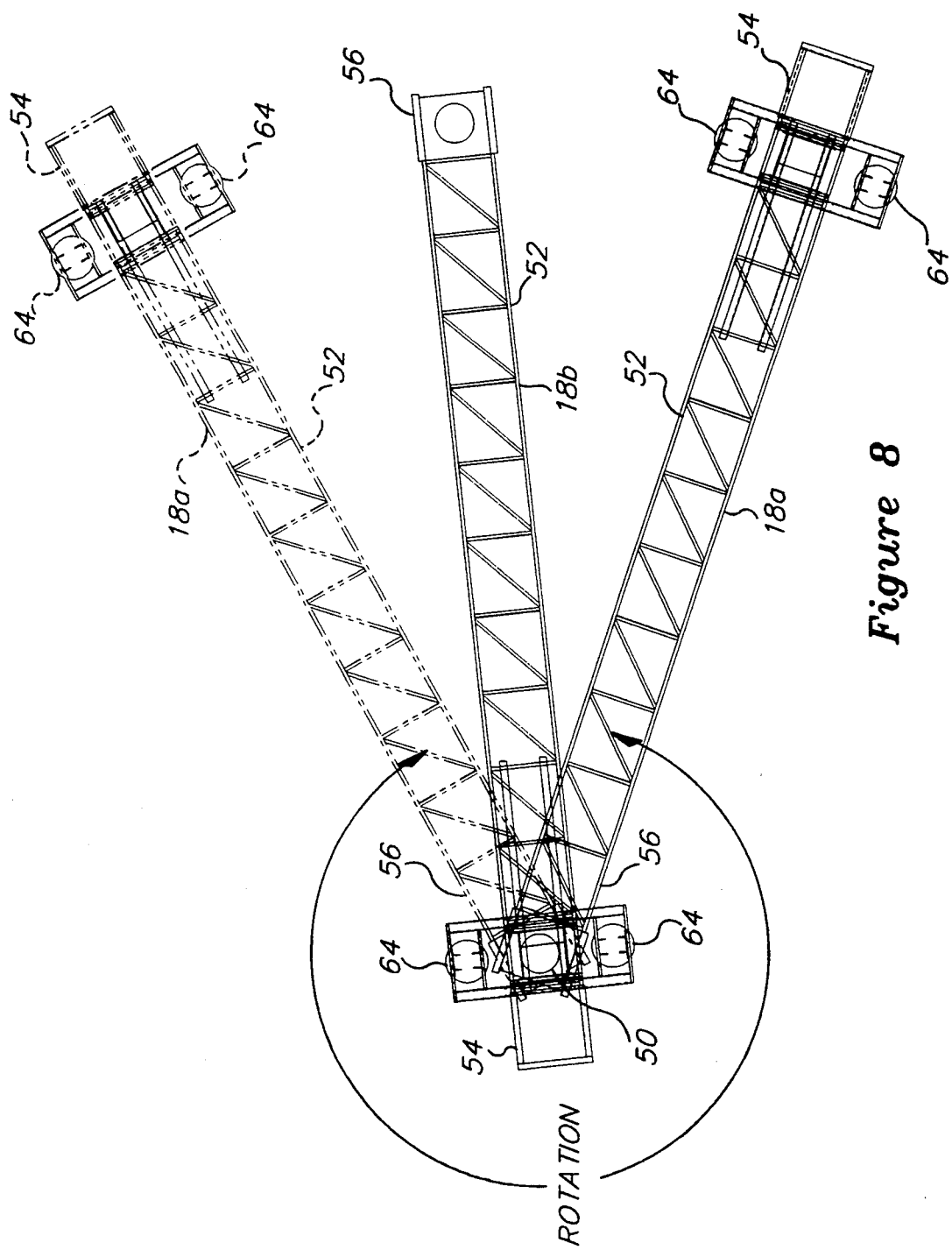
FIG. 8 is a reduced scale top plan view of two trailing conveyors demonstrating the extent of possible horizontal rotation or scissoring movement of one trailing conveyor relative to another.
Figure 9:
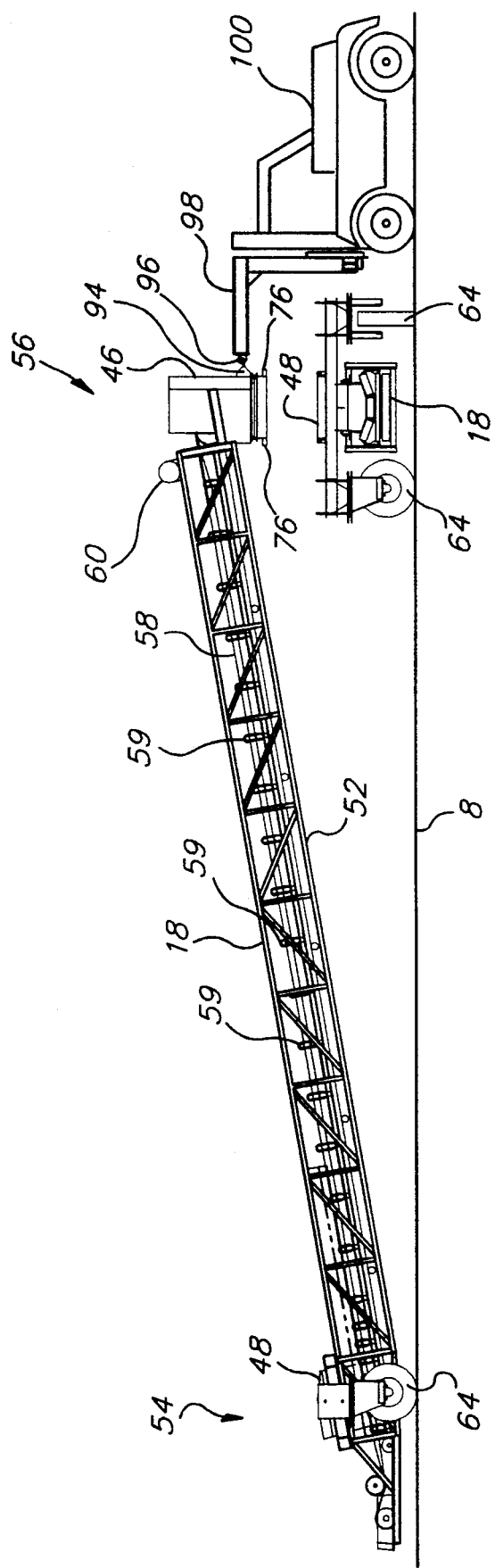
FIG. 9 is a side elevational view of the first and second trailing conveyors of FIG. 6 with the upper hopper of the first trailing conveyor being held by a forklift for purposes of installation or removal from the lower hopper of the second trailing conveyor which is shown oriented at a right angle relative to the first trailing conveyor.

The lower hopper 48 is attached to the support frame 52 at a position toward the forward end 54 just rearward of the motor 60. The forward end 54 of the trailing conveyor 18 is rollingly supported above the ground surface 8 by a pair of laterally spaced apart caster wheels 64, with one wheel positioned to each side of the support frame 52 as best illustrated in FIG. 8 and 9. The trailing conveyors 18 has the upper hopper 46 attached to the support frame 52 at the rearward end 56. As will be described in detail below, the upper hopper 46 is constructed to mate with the lower hopper 48 of the next rearward trailing conveyor, as illustrated in FIG. 6, or with the lower hopper mounted on the terminal support 20.

As previously noted, one of the upper hoppers 46 is also attached at the rearward end of the underconveyor 14 and one of the lower hoppers 48 is attached to the terminal support 20. As shown in FIG. 1, the lower hopper 48 attached to the terminal support 20 is held thereby in a raised position above the fixed conveyor 22 to deposit material thereon transferred to it by the upper hopper 46 of the third trailing conveyor 18c on the fixed conveyor. The terminal support 20 also holds the rearward end of the third trailing conveyor 18c in a fixed location to allow the string of trailing conveyors 18 to be pulled or pushed about by the excavator 12 as needed for the excavator to reach the full extent of the stockpile 34. As will be described below, the upper hopper 46 is designed to permit rotation of the trailing conveyors 18 relative to the underconveyor 14 and the terminal support 20 as the excavator 12 moves about.

The construction of the transition hopper 50 is best shown in FIGS. 10-13 which illustrate the transition hopper separate from the underconveyor 14, the trailing conveyors 18 and the terminal support 20. The lower hopper 48 includes a downwardly tapering rectangular lower housing 66 which is fixedly attached to the support frame 52 of the trailing conveyor 18 on which mounted above the endless belt 58 at a position toward the forward end 54 of the trailing conveyor. The lower housing 66 directs the material received from the upper hopper 46 onto the endless belt 58. Attached to the lower housing 66 is an elongated belt cover 68 which is positioned above the endless belt 58 and extends from the lower housing 66 at least partially toward the rearward end 56 of the trailing conveyor 18 to confine the material being conveyed on the endless belt as it moves away from the lower hopper 48.

Figure 10:
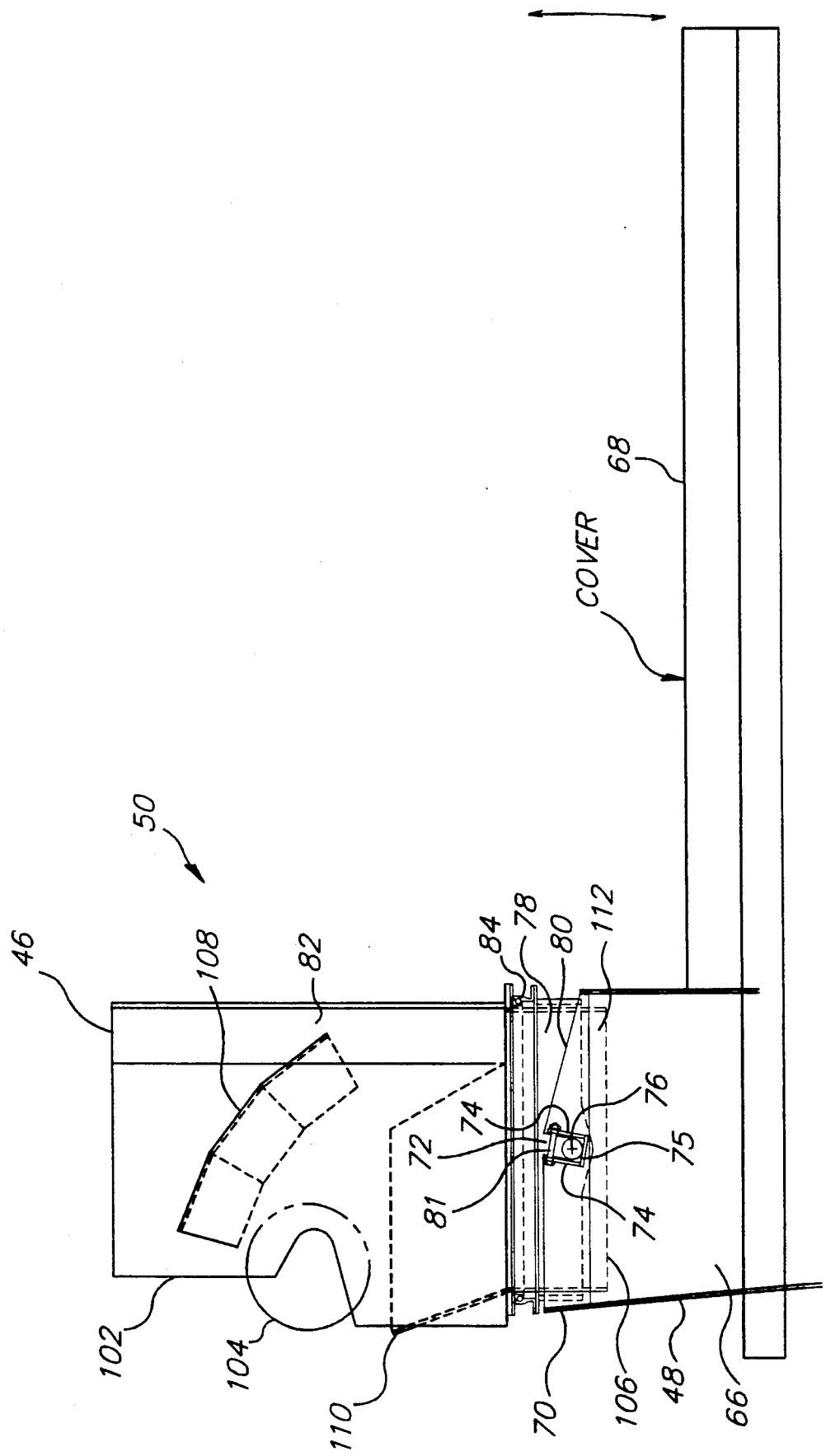
FIG. 10 is an enlarged, side elevational view of one of the transition hoppers shown in FIG. 1 having the upper hopper mounted on the corresponding lower hopper without illustrating the remainder of the feeder conveyor system.

As is best shown in the side elevational view of the transition hopper 50 in FIG. 10, the lower housing 66 has an upper end wall portion 70 with a pair of upwardly open slots 72 cut therein, one on the left and one on the right side. The slots 72 are shown angled slightly rearward in FIG. 10, but when the trailing conveyor 18 is positioned for use with the rear end 56 elevated, the slots have a vertical orientation. A pair of laterally outward projecting ears 74 are attached at the forward and rearward edges of each of the slots 72 and a flange 75 is attached at the base of each slot. The slots 72 are sized to each loosely receive therein from above one of a pair of connector pins 76 of the upper hopper 46. The connector pins 76 are fixedly attached to and project laterally outward to the left and right sides from a cylindrical lower end support portion 78 of the upper hopper portion 46 along a common generally horizontal axis, and have a length to project through the slots 72. The connection pins 76 rest upon the flange 75 at the base of the slots 72 and when the feeding system 10 is being moved, the towing force is transferred through the connection pins engaging the ears 74 at the forward and rearward edges of the slots.

Each ear of the left and right pairs of ears 74 has a hole 79 therein positioned above the connector pin 76 and sized to receive a removable retainer pin 81 which extends between the ears of each pair of ears. When the upper hopper 46 is positioned with the connector pins 76 in the slots 72 of the lower hopper 48, and the retainer pin 81 for each pair of ears is in place, the upper and lower hoppers are securely locked together for use of the feeder system 10.

When the upper hopper 46 is in position above a corresponding lower hopper 48, the lower end support portion 78 of the upper hopper projects downwardly within the upper end wall portion 70 of the lower hopper and is held in position by the connector pins 76 resting in the slots 72. This arrangement allows the upper hopper 46 and the lower hopper 48 to tilt or rotate relative to each other through a vertical plane within at least a limited range. To facilitate the forward tilting or rotation of the upper hopper 46 relative to the lower hopper 48 within the vertical plane, about the axis of the connector pins 76, a forward portion 80 of the upper end wall portion 70 of the lower housing 66 slopes downwardly. The degree of side slope selected for the downwardly tapering rectangular housing 66 also in part determines the amount the upper hopper 46 can rotate forward relative to the lower hopper 48. While the upper and lower hoppers 46 and 48 are shown in FIG. 10 aligned on a vertical axis, during actual use of the feeder system 10, the upper hopper and lower hopper must be able to rotate relative to each other through a vertical plane to accommodate the rearwardly rising upward slope of the underconveyor 14 and the trailing conveyors 18 which results when the upper hopper is mounted above the lower hopper such as shown in FIG. 1, and to accommodate the vertical movement of the underconveyor and the trailing conveyors which results as the excavator moves over the ground surface 8 which might not be completely level and as the loading hopper 36 raises and lowers while towing the trailing conveyors behind the excavator.

The connection pins 76 residing in the slots 72 provides a strong coupling between the upper hopper 46 and the corresponding lower hopper 48 to transmit the towing force applied between the underconveyor 14 and the first trailing conveyor 18a and between each of the trailing conveyors 18 as the excavator 12 moves about to tow the trailing conveyors while conveying material. Also, the connector pins 76 of the upper hopper 46 of the third trailing conveyor 18c residing in the slots 72 of the lower hopper 48 mounted to the terminal support 20 also provides the coupling which anchors the rearward end of the string of the trailing conveyors 18 in position at the fixed conveyor 22 against the forces produced as the excavator 12 moves about to remove the material from the stockpile 34.

Figures 12, 13:
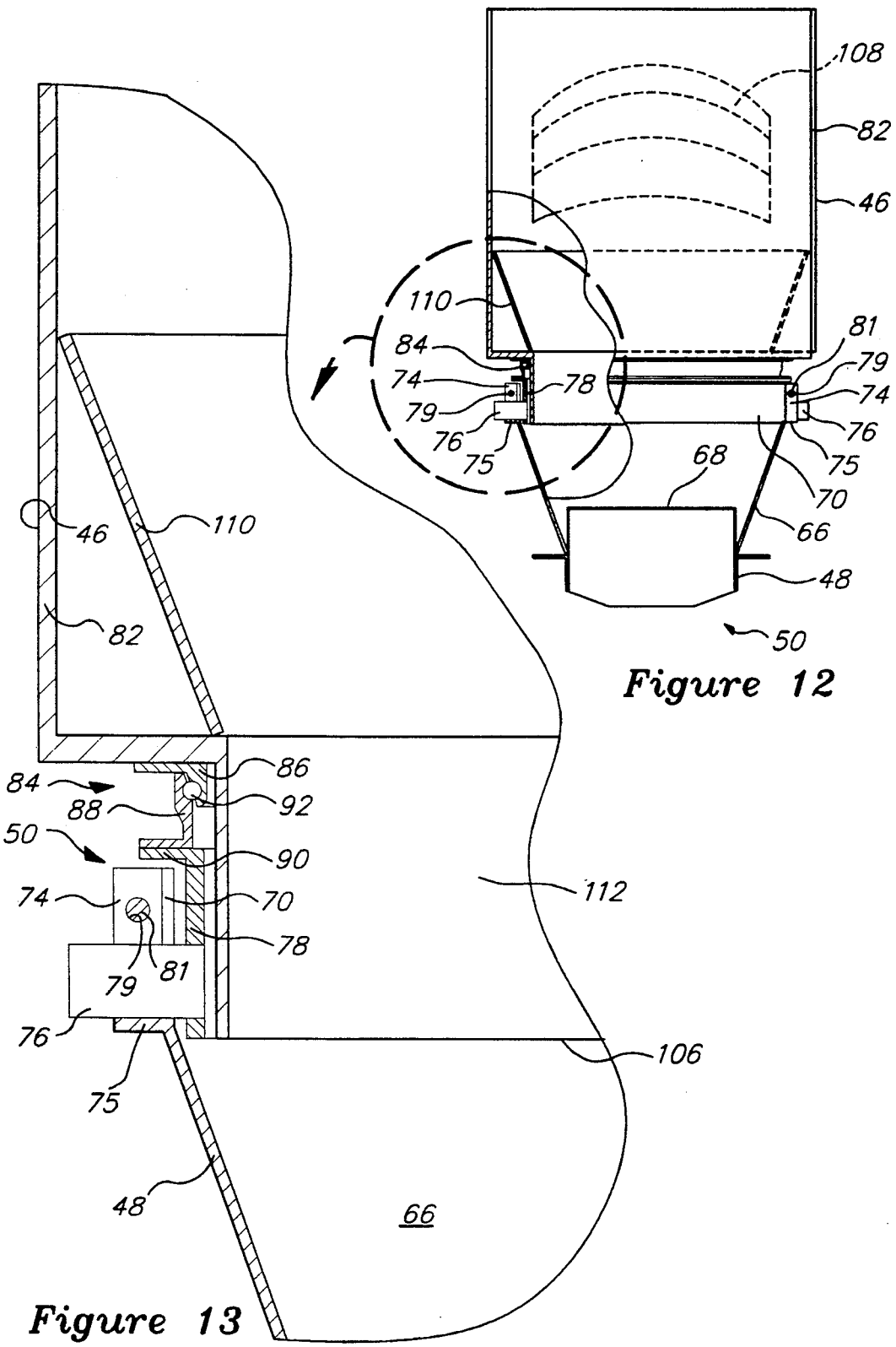
FIG. 12 is an enlarged, fragmentary, rear view of the transition hopper shown in FIG. 10.
FIG. 13 is an enlarged, fragmentary, side elevational view of the transition hopper shown in FIG. 12.

To permit the scissoring movement of the trailing conveyors 18 as the excavator 12 moves about, such as between the two illustrative positions shown in FIGS. 4 and 4A, or the range of positions illustrated in FIG. 8, the transition hopper 50 must also permit rotation of the trailing conveyors 18 through a generally horizontal plane relative to each other, the underconveyor 14 and the terminal support 20. This rotation is provided by constructing the upper hopper 46 with a housing 82 which is rotatable relative to the lower end support portion 78 of the upper hopper about a generally vertical axis. As best shown in FIG. 13, an annular bearing 84 has an inner bearing ring 86 fixedly attached to the housing 82 and an outer bearing ring 88 fixedly attached atop a top flange 90 of the lower end support portion 78. The outer bearing ring 88 is in coaxial position with and extending fully around the inner bearing ring 86. The inner and outer bearing rings 86 and 88 each have a ball race formed therein confronting and corresponding to the ball race in the others, and have a plurality of ball bearings 92 rollingly disposed in the races. This arrangement permits each of the trailing conveyors 18 to rotate substantially 150 degrees to each side of a straight line alignment of the conveyors, for a total rotation of one trailing conveyor relative to another of 300 degrees, such as shown in FIG. 8 with the first trailing conveyor 18a rotating relative to the second trailing conveyor 18b.

The horizontal rotation of the trailing conveyors 18 relative to each other is limited only by the physical closing range of one trailing conveyor relative to the other. The closing range achievable will depend upon the thickness of the conveyors used and the height the rearward end 56 of one trailing conveyor 18 is above the next trailing conveyor. The connection of the rearward end 56 of the support frame 52 to the mid-portion of the upper hopper 46 so that the lower end support portion 78 and the housing 82 of the upper hopper project well below the height of the rearward end 56 of the support frame 52 keeps the rearward end of the support frame clear of the forward end 54 of the support frame of the immediately next forward trailing conveyor to facilitate a greater degree of scissoring movement.

By permitting rotation of the housing 82 relative to the lower end support portion 78 of the upper hopper 46, and by permitting the entire upper hopper 46 to pivot on the connection pins 76 for movement through a vertical plane relative to the lower hopper 48, both horizontal rotation and vertical rotation between the trailing conveyors 18, between the first trailing conveyor 18a and the underconveyor 14, and between the third trailing conveyor 18c and the terminal support 20 is achieved. This construction, which allows simultaneous horizontal and vertical rotation of conveyors connected together by the transition hopper 50, is extremely important for the feeder system 10 since it is intended to be in continuous use, transporting material along the conveyors using belt speeds of 500 feet per minute, while the excavator 12 moves about and tows the trailing conveyors 18 behind it over the ground surface 8 which may not be completely level, or over small remaining piles of the material.

Not only does the construction of the transition hopper 50 permit both vertical and horizontal rotation, it also provides for a strong coupling between the conveyors which can transfer the towing forces that are applied to the feeder system 10 as the excavator 12 moves about while the conveyors are conveying material. It is noted that the wheels 64 of the third and last trailing conveyor 18c in the string of conveyors may have its wheels set perpendicular to the support frame 52 to minimize towing forces being transferred to the terminal support 20.

To achieve the versatility required when operating the feeder system 10 of the present invention at different locations, and even at one location as the stockpile 34 grows smaller as material is removed or larger as material is added, it is necessary to provide for the quick and easy addition and removal of one or more of the trailing conveyors 18 from the string. This allows the operator to selectively and as frequently as needed change the length of the string of trailing conveyors 18 towed behind the excavator 12. As shown in FIG. 9, the upper hopper 46 is provided with a lifting flange 94 at its rearward end which can be engaged by a pintle 96 of an arm 98 carried by a front-end loader (not shown) or a forklift 100. The forklift 100 is able to raise and lower the arm 98, and hence the upper hopper 46, and also move the upper hopper laterally, either to disconnect the upper hopper from a lower hopper by lifting the upper hopper upwardly for disconnection, or to connect the upper hopper to the lower hopper by portioning the upper hopper above and lowering it toward the lower hopper until the connection pins are received in the slots 72. The forklift 100 can also be used to tow one or more of the trailing conveyors 18 about to position them at another stockpile or for inclusion in the string of conveyors or move them out of the way for storage when disconnected from the other trailing conveyors.

Figure 11:
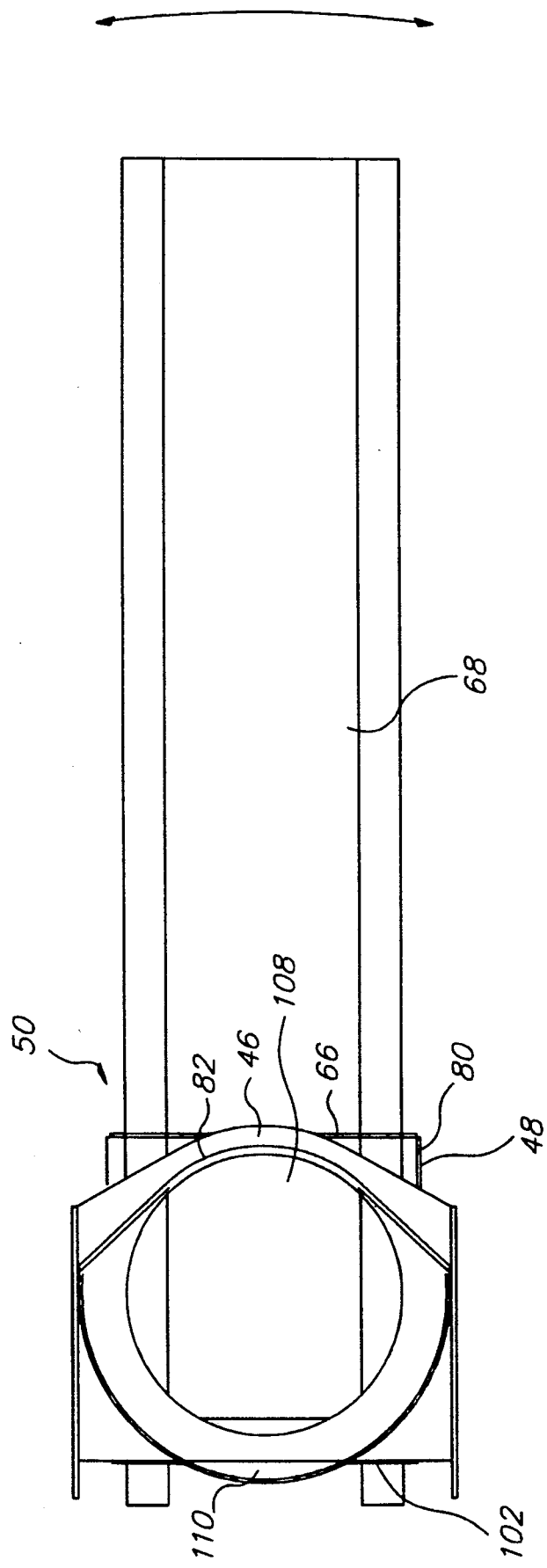
FIG. 11 is a top plan view of the transition hopper shown in FIG. 10.

Because of the high rates of belt speed required to effectively move the material, it is important to efficiently handle the flow of the material along the feeder system 10. This is particularly important in the area of the transition hoppers 50 where the material must make a transition from one conveyor to the next. The efficient handling of the material by the transition hopper 50 is accomplished by forming the housing 82 of the upper hopper 46 as a fully enclosed hood with a forwardly facing entrance opening 102 as shown in FIGS. 10 and 11. A head pulley 104, over which the endless belt 58 passes for the trailing conveyor 18 and the underconveyor 14, is positioned partially within the entrance opening 102 of the housing 82. The housing 82 provides a complete enclosure except for the entrance opening 102 and a lower opening 106 through which the material passes to the lower hopper 48.

Positioned within the housing 82 is a deflector chute 108 positioned to engage the material which passes from the rearward end of the endless belt 58 and direct the flow of the material downward within the housing 82. The deflector chute 108 is rounded and contoured to provide a smooth path for directing the material flow downward. The deflector chute 108 is adjustable so that the slope at which it receives the material can be changed to maximize the flow of the material being handled.

The upper hopper 46 includes a funnel portion 110 positioned substantially fully within the housing 82, and below the head pulley 104 and the deflector chute 108 to collect the material discharged from the endless belt 58 and direct it downward to a cylindrical throat portion 112 of the housing 82. The throat portion 112 projects downward through the inner bearing ring 86 and the central aperture of the lower end support portion 78. The throat portion 112 extends downwardly within the housing 66 of the lower hopper 48 to a position below the connector pins 76 and terminates to define the lower end opening 106.

The material that passes through the throat portion 112 falls downward onto the endless belt 58 of the trailing conveyor 18 on which the lower hopper 48 is mounted. The housing 66 of the lower hopper 48 extends along the sides of the endless belt 58 on which the material is deposited and provides a full enclosure except for the openings for material flow. As previously noted, the cover 68 extends forwardly from the housing 66 over the endless belt 58 to prevent the material from leaving the belt as it moves away from the lower hopper 48.

With the arrangement of the feeder system 10, material can be transported along the underconveyor 14 and the string of trailing conveyors 18 being towed behind the excavator 12 and transferred between the conveyors and the fixed conveyor 22 using the fully enclosed transition hoppers 50 at a very high transport rate with the loss of little or no material at the transitions between the conveyors, while still permitting the needed horizontal and vertical rotation between the conveyors. The feeder system 10 provides a high level of production with little spillage and allows quick and easy assembly and disassembly of the feeder system as needed to increase or decrease the number of trailing conveyors 18 being used. The transition hopper 50 is designed to permit towing of the transition hoppers behind the excavator and sustain the rigors of such movement, while continuing the transport of materials. The materials are transported along the conveyors without any reduction in the rate of transport even though the trailing conveyors 18 may be moving toward an extended arrangement or experiencing a scissor movement relative to each other as the excavator 12 tows or pushes them about. In use, the feeder system 10 requires only a single operator running the excavator 12 and, generally, no operators are required to reposition the trailing conveyors. The excavator 12 feeds the material to the underconveyor 14 whereon it automatically passes under the excavator platform 24 to the rear of the underconveyor where it is carried to the first trailing conveyor 18a and then to the successive second and third trailing conveyors 18b and 18c until the ultimate discharge of the material onto the fixed conveyor 22 which may be located a substantial distance from the stockpile 34.

As previously indicated, one of the upper hoppers 46 is mounted to the rearward end of the underconveyor 14 and one of the lower hoppers 48 is mounted atop the terminal support 20. The lower hopper 48 mounted to the terminal support 20 is designed much like the lower hoppers used for the trailing conveyors 18, and the upper hopper 46 of the third trailing conveyor 18c in the string is connected thereto to permit horizontal and vertical rotation of the third trailing conveyor relative to the terminal support. As described above, the horizontal rotation of the third trailing conveyor 18c is provided by the annular bearing 84 which comprises a portion of the upper hopper 46 of the third trailing conveyor 18c.

While not believed necessary for most situations, the trailing conveyors 18 may be provided with an independent drive and steering arrangement to control their relative position and travel. Also, the trailing conveyors may be provided with self-leveling suspensions to help maintain a level position when traveling over rough or irregular terrain.

Figure 14A:
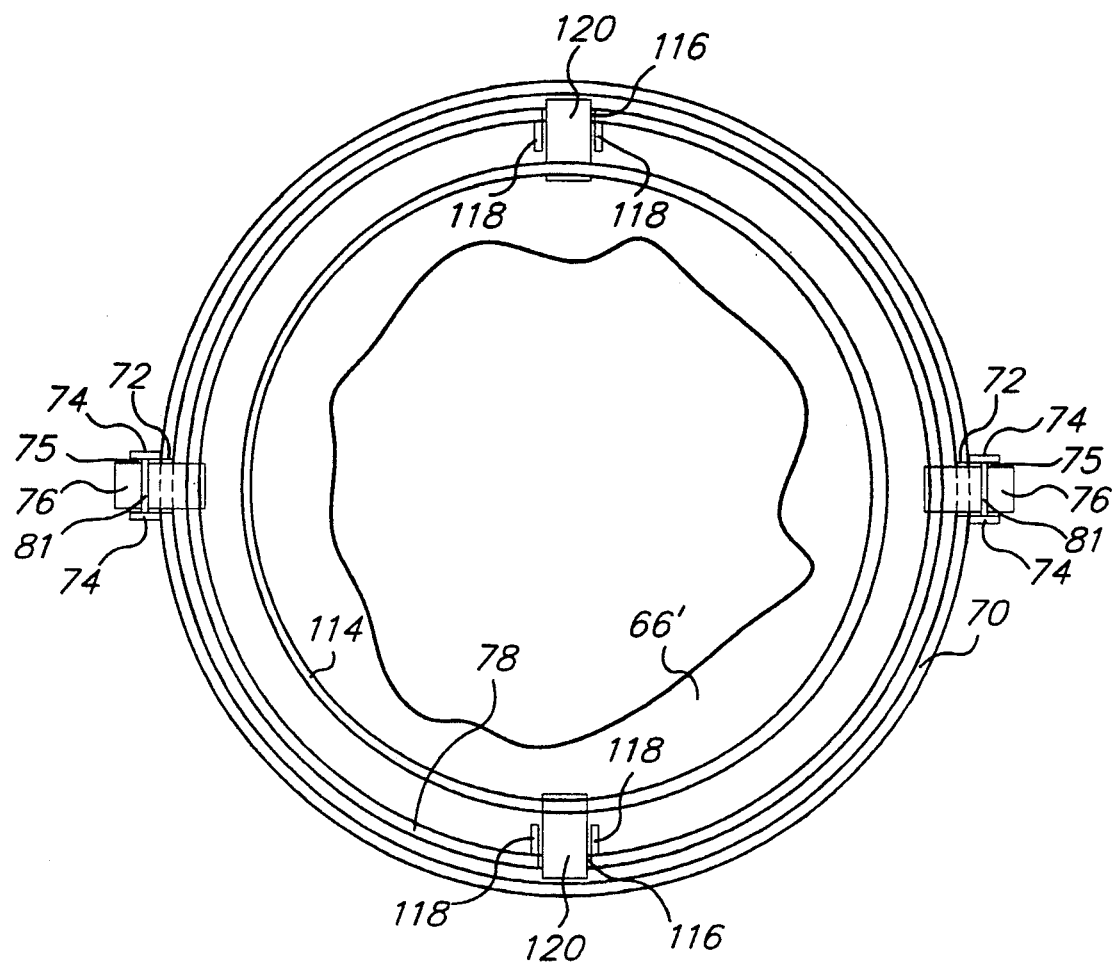
FIG. 14A is an enlarged top plan view of an alternative embodiment using a gimbal support for an annular bearing shown in FIG. 13.
Figure 14B:
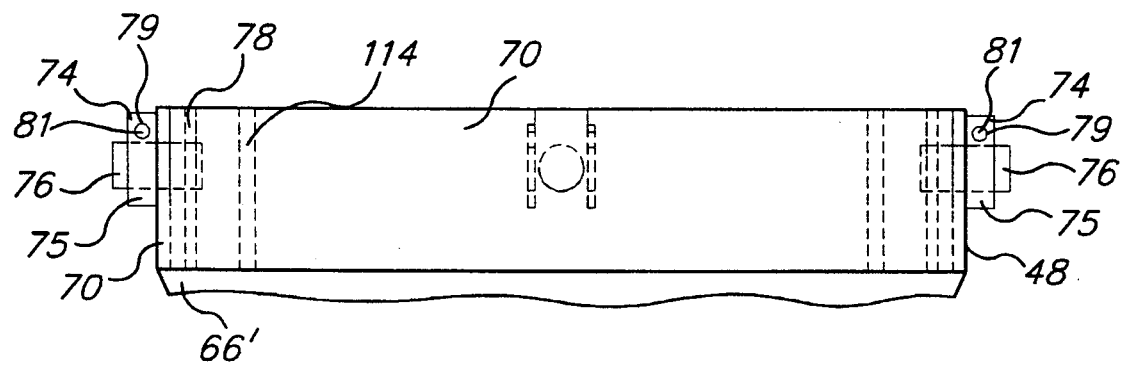
FIG. 14B is a fragmentary side elevational view of the gimbal support.

For use in rough or irregular terrain, full vertical rotation may be achieved by supporting the annular bearing 84 using a gimbal arrangement. As shown in FIGS. 14A and 14B, instead of fixedly attaching the outer bearing race 88 directly to the lower end support portion 78, an intermediate support ring 114 is used and the outer bearing race 88 is attached to the intermediate support ring. Just as the lower end support portion 78 is rotatable through a vertical plane relative to the lower hopper 48 using the connection pins 76, the intermediate support ring 114 is rotatable through a vertical plane relative to the lower end support portion 78, the two vertical planes being oriented transverse to each other. The lower end support portion 78 has a pair of upwardly open slots 116 cut therein on opposite sides thereof, located ninety degrees displaced from the position of the slots 72 in the upper end wall portion 70 of the lower housing 66'. It is noted that the lower housing 66' in the illustrated alternative embodiment of FIGS. 14A and 14B has a circular funnel shape. A pair of outward projecting ears 118 are attached at the edges of each of the slots 116. The slots 116 are sized to each loosely receive therein from above one of a pair of connector pins 120 of the intermediate support ring 114. The connector pins 120 are fixedly attached to and project laterally outward to the front and rear sides from the intermediate support ring 114 along a common generally horizontal axis, and have a length to project through the slots 116. Thus, the upper hopper 46 and the lower hopper 48 can tilt or rotate relative to each other through two transversely oriented vertical planes with this gimbal arrangement.

It should be understood that while the feeder system 10 is illustrated using three trailing conveyors 18, the number of trailing conveyors required depends upon the distance between the stockpile 34 and the fixed conveyor 22, and also upon the size, power and traction of the excavator 12 used.

It will be appreciated that, although a specific embodiment of the invention has been described herein for purposes of illustration, various modifications may be made without departing from the spirit and scope of the invention. Accordingly, the invention is not limited except as by the appended claims.

We claim:
1. A flexible feeder conveyor system for removing material from a stockpile and transporting the removed material to a fixed conveyor, comprising:
an excavator having a backhoe arm;
an underconveyor positioned beneath and attached to said excavator for travel therewith, said underconveyor extending at an upper incline from a forward end at a forward end of said excavator to an elevated rearward end located rearward of said excavator;

a loading hopper attached to said underconveyor forward end to receive the material being removed using said backhoe arm, said loading hopper depositing the material received therein on said underconveyor for transport to said underconveyor rearward end;

a terminal support member positioned to remain at the fixed conveyor as said excavator moves about;

a string of at least two trailing conveyors extending between said rearward end of said underconveyor and said terminal support member, each trailing conveyor extending at an upper incline from a forward end to an elevated rearward end, each said trailing conveyor forward end being rollingly supported by at least one wheel for travel as said excavator moves about;

a plurality of upper hoppers, one being mounted to said underconveyor at said underconveyor rearward end and one being mounted to each of said trailing conveyors at said trailing conveyor rearward end, said upper hopper of said underconveyor being positioned to receive material transported on said underconveyor and said upper hopper of each of said trailing conveyors being positioned to receive material transported on said trailing conveyor to which mounted, each of said upper hoppers having an annular support portion with a pair of pivot pins attached thereto, with said pivot pins extending outward from opposing sides thereof, and a first housing portion rotatably supported by said support portion for rotation relative thereto through a generally horizontal plane, said first housing portion including a first receiving opening into which the corresponding one of said underconveyor or said trailing conveyor to which mounted extends to deposit the material being transported thereon within said first housing portion, a deflector deflecting downward the material received through said first receiving opening, a first funnel receiver portion receiving the downwardly deflected material from said deflector, and a funnel throat portion extending downwardly within said support portion and receiving the material from said funnel receiver portion, said funnel throat portion terminating in a first exit opening through which the material entering said first receiving opening exits from said first housing portion; and a plurality of lower hoppers, one being mounted to each of said trailing conveyors at said trailing conveyor forward end and one being mounted to said terminal support member at a position above the fixed conveyor, said lower hopper of said trailing conveyors and said terminal support member being positioned below said upper hopper of the immediately forward one of said underconveyor or said trailing conveyors to receive material from said upper hopper, each of said lower hoppers having a second housing portion, and a pair of pin receivers supported by said second housing portion, with said receivers being located at opposing sides of said second housing portion to pivotally receive a corresponding one of said pivot pins of said upper hopper positioned thereabove for rotation of said upper hopper relative to said lower hopper through a generally vertical plane, said second housing portion including a second funnel receiver portion receiving therewithin said funnel throat portion of said upper hopper positioned thereabove to receive the material exiting from said first exit opening, and a second exit opening through which the material received by said second funnel receiver portion exits from said second housing portion and is deposited onto the corresponding one of said trailing conveyors to which mounted for transport rearward along said trailing conveyor to the one of said upper hoppers mounted to the immediately rearward one of said trailing conveyor or onto the fixed conveyor, the interconnection of the corresponding ones of said upper and lower hoppers transmitting the towing force of said excavator from the said underconveyor through said string of trailing conveyors to tow said string of trailing conveyors behind said underconveyor as said excavator moves about, whereby said string of trailing conveyors is connected together for towing behind said excavator with the forwardmost one of said string connected to said underconveyor and the rearwardmost one of said string anchored to said terminal support member.

2. The feeder conveyor system of claim 1 wherein said pin receivers each include a selectively removable retainer pin which, when in place, locks one of said pivot pins within said pin receiver to prevent removal therefrom during usage of the feeder conveyor system.

3. The feeder conveyor system of claim 1 wherein said deflector is selectively adjustable to control the direction of flow of the material engaging said deflector.

4. The feeder conveyor system of claim 1 wherein said pin receivers are upwardly open slots formed in said second housing portion, each sized to loosely receive one of said pivot pins therein to permit said pivot pins to rotate within said slots.

5. The feeder conveyor system of claim 4, wherein said slots are substantially vertically oriented.

6. The feeder conveyor system of claim 1, wherein said underconveyor is pivotally attached to said excavator for rotation through a vertical plane to permit said loading hopper to be raised or lowered relative to the ground surface.

7. A flexible feeder conveyor system for removing material and transporting the removed material to a distant location, comprising:

a mobile vehicle;

a material handling member attached to said vehicle to move the material toward the forward end of said vehicle;

a first conveyor carried by said vehicle for travel therewith, said first conveyor extending at an upper incline from a forward end at a forward end of said vehicle to an elevated rearward end;

a conveyor loader attached to said first conveyor forward end to receive the material being moved using said material handling member, said conveyor loader depositing the material received therein on said first conveyor for transport to said first conveyor rearward end;

a terminal support member positioned to remain at the distant location where the removed material is to be deposited as said vehicle moves about;

a string of at least two trailing conveyors extending between said rearward end of said first conveyor and said terminal support member, each trailing conveyor extending at an upper incline from a forward end to an elevated rearward end, each said trailing conveyor forward end being rollingly supported above the ground by a pair of laterally spaced-apart caster wheels for travel as said vehicle moves about and each said trailing conveyor rearward end being positioned above the ground out of contact therewith except through said forward pair of wheels of the immediately rearward one of said trailing conveyors or through said terminal support member;

a plurality of upper hoppers, one being mounted to said first conveyor at said first conveyor rearward end and one being mounted to each of said trailing conveyors at said trailing conveyor rearward end, said upper hopper of said first conveyor being positioned to receive material transported on said first conveyor and said upper hopper of each of said trailing conveyors being positioned to receive material transported on said trailing conveyor to which mounted, each of said upper hoppers having an annular support portion positioned on a generally upward-oriented rotation axis with a pair of pivot pins attached to said support portion, with said pivot pins extending outward from opposing sides thereof along a laterally oriented pivot axis, a first housing portion with a fully enclosing sidewall and a top closing said sidewall from above, and an annular bearing member positioned coaxial with said support portion about said rotation axis and between said support portion and said first housing portion with one bearing ring attached to said support portion, another bearing ring attached to said first housing, and bearings positioned between said bearing rings to rotatably support said first housing by said support portion for rotation relative thereto through a generally horizontal plane about said axis, said first housing portion including a first forwardly facing receiving opening formed in said sidewall into which the corresponding one of said first conveyor or said trailing conveyor to which mounted extends to deposit the material being transported thereon within said first housing portion, a deflector deflecting downward the material received through said first receiving opening, a first funnel receiver portion receiving the downwardly deflected material from said deflector, and a funnel throat portion extending downwardly within both said annular bearing and said support portion and receiving the material from said funnel receiver portion, said funnel throat portion terminating in a first exit opening through which the material entering said first receiving opening exits from said first housing portion; and a plurality of lower hoppers, one being mounted to each of said trailing conveyors at said trailing conveyor forward end and one being mounted to said terminal support member, said lower hopper of said trailing conveyors and said terminal support member being positioned below said upper hopper of the immediately forward one of said first conveyor or trailing conveyors to receive material from said upper hopper, each of said lower hoppers having a second housing portion, and a pair of upwardly open slots formed in said second housing portion, with said slots being located at opposing sides of said second housing portion along said pivot axis and sized to loosely receive a corresponding one of said pivot pins therein of said upper hopper positioned thereabove for rotation of said upper hopper relative to said lower hopper through a generally vertical plane about said pivot axis, said second housing portion including a second funnel receiver portion receiving therewithin said funnel throat portion of said upper hopper positioned thereabove to receive the material exiting from said first exit opening, and a second exit opening through which the material received by said second funnel receiver portion exits from said second housing portion and is deposited onto the corresponding one of said trailing conveyors to which mounted for transport rearward along said trailing conveyor to the one of said upper hoppers mounted to the immediately rearward one of said trailing conveyor or at the distant location, the interconnection of the corresponding ones of said upper and lower hoppers transmitting the towing force of said vehicle from the said first conveyor through said string of trailing conveyors to tow said string of trailing conveyors behind said first conveyor as said vehicle moves about.

8. A flexible feeder conveyor system for removing material and transporting the removed material to a distant location, comprising:

a mobile vehicle;

a material handling member attached to said vehicle to move the material toward the forward end of said vehicle;

a first conveyor carried by said vehicle for travel therewith, said first conveyor extending at an upper incline from a forward end at a forward end of said vehicle to an elevated rearward end, said first conveyor forward end being positioned to receive the material being moved using said material handling member, said first conveyor moving the material received on said first conveyor forward end to said first conveyor rearward end;

a terminal support member positioned to remain at the distant location where the removed material is to be deposited as said vehicle moves about;

a string of at least two trailing conveyors extending between said rearward end of said first conveyor and said terminal support member, each trailing conveyor extending at an upper incline from a forward end to an elevated rearward end, each said trailing conveyor forward end being rollingly supported by at least one wheel for travel as said vehicle moves about;

a plurality of upper hoppers, one being mounted to said first conveyor at said first conveyor rearward end and one being mounted to each of said trailing conveyors at said trailing conveyor rearward end, said upper hopper of said first conveyor being positioned to receive material transported on said first conveyor and said upper hopper of each of said trailing conveyors being positioned to receive material transported on said trailing conveyor to which mounted, each of said upper hoppers having an annular support portion with a pair of pivot pins attached thereto, with said pivot pins extending outward from opposing sides thereof, and a first housing portion rotatably supported by said support portion for rotation relative thereto through a generally horizontal plane, said first housing portion including a first receiving opening into which the corresponding one of said first conveyor or said trailing conveyor to which mounted extends to deposit the material being transported thereon within said first housing portion, a deflector deflecting downward the material received through said first receiving opening, a first funnel receiver portion receiving the downwardly deflected material from said deflector, and a funnel throat portion extending downwardly within said support portion and receiving the material from said funnel receiver portion, said funnel throat portion terminating in a first exit opening through which the material entering said first receiving opening exits from said first housing portion; and a plurality of lower hoppers, one being mounted to each of said trailing conveyors at said trailing conveyor forward end and one being mounted to said terminal support member, said lower hopper of said trailing conveyors and said terminal support member being positioned below said upper hopper of the immediately forward one of said first conveyor or said trailing conveyors to receive material from said upper hopper, each of said lower hoppers having a second housing portion, and a pair of receivers supported by said second housing portion, with said receivers being located at opposing sides of said second housing portion to pivotally receive a corresponding one of said pivot pins of said upper hopper positioned thereabove for rotation of said upper hopper relative to said lower hopper through a generally vertical plane, said second housing portion including a second funnel receiver portion receiving therewithin said funnel throat portion of said upper hopper positioned thereabove to receive the material exiting from said first exit opening, and a second exit opening through which the material received by said second funnel receiver portion exits from said second housing portion and is deposited onto the corresponding one of said trailing conveyors to which mounted for transport rearward along said trailing conveyor to the one of said upper hoppers mounted to the immediately rearward one of said trailing conveyor or at the distant location, the interconnection of the corresponding ones of said upper and lower hoppers transmitting the towing force of said vehicle from said first conveyor through said string of trailing conveyors to tow said string of trailing conveyors behind said first conveyor as said vehicle moves about.

9. A flexible feeder conveyor system for removing material and transporting the removed material to a distant location, comprising:

a mobile vehicle;

a material handling member attached to said vehicle to move the material toward the forward end of said vehicle;

a first conveyor carried by said vehicle for travel therewith, said first conveyor extending at an upper incline from a forward end at a forward end of said vehicle to an elevated rearward end;

a conveyor loader attached to said first conveyor forward end to receive the material being moved using said material handling member, said conveyor loader depositing the material received therein on said first conveyor for transport to said first conveyor rearward end;

a terminal support member positioned to remain at the distant location where the removed material is to be deposited as said vehicle moves about;

a string of at least two trailing conveyors extending between said rearward end of said first conveyor and said terminal support member, each trailing conveyor extending at an upper incline from a forward end to an elevated rearward end, each said trailing conveyor forward end being rollingly supported by at least one wheel for travel as said vehicle moves about; and a plurality of transition hoppers, one connecting said first conveyor to the forwardmost one of said trailing conveyors, one connecting the rearwardmost one of said trailing conveyors to said terminal support, and one connecting together each of said trailing conveyors to the next rearward one of said trailing conveyors, each said transition hopper having an upper hopper mounted above and secured to a lower hopper, one of said upper hoppers being mounted to said first conveyor at said first conveyor rearward end and one being mounted to each of said trailing conveyors at said trailing conveyor rearward end, one of said lower hoppers being mounted to each of said trailing conveyors at said trailing conveyor forward end and one being mounted to said terminal support member, said upper hopper of said first conveyor being positioned to receive material transported on said first conveyor and said upper hopper of each of said trailing conveyors being positioned to receive material transported on said trailing conveyor to which mounted, each of said upper hoppers having a support portion with a central aperture and a pair of pivot pins attached thereto, with said pivot pins extending outward from opposing sides thereof, and a first housing portion rotatably supported by said support portion for rotation relative thereto through a generally horizontal plane, said first housing portion including a first receiving opening into which the corresponding one of said first conveyor or said trailing conveyor to which mounted deposits the material being transported thereon, and a first receiver portion extending downwardly within said central aperture of said support portion and receiving the material received through said receiver opening, said first receiver portion terminating in a first exit opening through which the material entering said first receiving opening exits from said first housing portion, each of said lower hoppers having a second housing portion and a pair of receivers supported by said second housing portion, with said receivers being located at opposing sides of said second housing portion to pivotally receive a corresponding one of said pivot pins of said upper hopper positioned thereabove for rotation of said upper hopper relative to said lower hopper through a generally vertical plane, said second housing portion including a second receiver portion receiving the material exiting from said first exit opening of said first receiver portion, and a second exit opening through which the material received by said second receiver portion exits from said second housing portion and is deposited on the corresponding one of said trailing conveyors to which mounted for transport rearward along said trailing conveyor to the one of said upper hoppers mounted to the immediately rearward one of said trailing conveyor or at the distant location, the interconnection of the corresponding ones of said upper and lower hoppers transmitting the towing force of said vehicle from said first conveyor through said string of trailing conveyors to tow said string of trailing conveyors behind said first conveyor as said vehicle moves about.

10. A flexible feeder conveyor system for removing material and transporting the removed material to a fixed conveyor, comprising:

an excavator having a backhoe arm;

an underconveyor positioned beneath and attached to said excavator for travel therewith, said underconveyor extending at an upper incline from a forward end at a forward end of said excavator to an elevated rearward end located rearward of said excavator;

a loading hopper attached to said underconveyor forward end to receive the material being removed using said backhoe arm, said loading hopper depositing the material received therein on said underconveyor for transport to said underconveyor rearward end;

a terminal support member positioned to remain at the fixed conveyor as said excavator moves about;

a string of at least two trailing conveyors extending between said rearward end of said underconveyor and said terminal support member, each trailing conveyor extending at an upper incline from a forward end to an elevated rearward end, each said trailing conveyor forward end being rollingly supported by at least one wheel for travel as said excavator moves about;

a plurality of upper hoppers, one being mounted to said underconveyor at said underconveyor rearward end and one being mounted to each of said trailing conveyors at said trailing conveyor rearward end, said upper hopper of said underconveyor being positioned to receive material transported on said underconveyor and said upper hopper of each of said trailing conveyors being positioned to receive material transported on said trailing conveyor to which mounted, each of said upper hoppers including a first receiving opening into which the corresponding one of said underconveyor or said trailing conveyor to which mounted extends to deposit the material being transported thereon within said upper hopper, a first funnel receiver portion receiving the material received through said first receiving opening, and a funnel throat portion extending downwardly and receiving the material from said funnel receiver portion, said funnel throat portion terminating in a first exit opening through which the material entering said first receiving opening exits from said upper hopper; and a plurality of lower hoppers, one being mounted to each of said trailing conveyors at said trailing conveyor forward end and one being mounted to said terminal support member at a position above the fixed conveyor, said lower hopper of said trailing conveyors and said terminal support member being positioned below said upper hopper of the immediately forward one of said underconveyor or said trailing conveyors to receive material from said upper hopper, each of said lower hoppers supporting the corresponding one of said upper hoppers positioned thereabove, with the corresponding one of said upper hoppers being rotatable through a generally horizontal plane and rotatable through a generally vertical plane relative to said lower hopper, each of said lower hoppers including a second funnel receiver portion receiving therewithin said funnel throat portion of said upper hopper positioned thereabove to receive the material exiting from said first exit opening, and a second exit opening through which the material received by said second funnel receiver portion exits from said lower hopper and is deposited onto the corresponding one of said trailing conveyors to which mounted for transport rearward along said trailing conveyor to the one of said upper hoppers mounted to the immediately rearward one of said trailing conveyor or onto the fixed conveyor, whereby said string of trailing conveyors is connected together for towing behind said excavator with the forwardmost one of said string connected to said underconveyor and the rearwardmost one of said string anchored to said terminal support member.

11. The feeder conveyor system of claim 10 wherein each of said upper hoppers has an annular support portion with a pair of pivot pins attached thereto, and a first housing portion rotatably supported by said support portion for rotation relative thereto through said generally horizontal plane, and wherein each of said lower hoppers has a pair of pin receivers to pivotally receive a corresponding pair of said pivot pins of said upper hopper positioned thereabove for rotation of said upper relative to said lower hopper through said generally vertical plane.

12. The feeder conveyor system of claim 11 wherein said pin receivers are upwardly open slots, each sized to loosely receive one of said pivot pins therein to permit said pivot pins to rotate within said slots.

13. The feeder conveyor system of claim 12 wherein said slots are substantially vertically oriented.

14. The feeder conveyor system of claim 10, further including a selectively adjustable deflector which deflects downward the material received through said first receiving opening into said first funnel receiver portion.

15. The feeder conveyor system of claim 10 wherein said underconveyor is pivotally attached to said excavator for rotation through a vertical plane to permit said loading hopper to be raised or lowered relative to the ground surface.

16. A flexible feeder conveyor system for removing material and transporting the removed material to a distant location, comprising:

a mobile vehicle;

a material handling member attached to said vehicle to move the material toward the forward end of said vehicle;

a first conveyor carried by said vehicle for travel therewith, said first conveyor extending at an upper incline from a forward end at a forward end of said vehicle to an elevated rearward end;

a conveyor loader attached to said first conveyor forward end to receive the material being moved using said material handling member, said conveyor loader depositing the material received therein on said first conveyor for transport to said first conveyor rearward end;

a terminal support member positioned to remain at the distant location where the removed material is to be deposited as said vehicle moves about;

a string of at least two trailing conveyors extending between said rearward end of said first conveyor and said terminal support member, each trailing conveyor extending at an upper incline from a forward end to an elevated rearward end, each said trailing conveyor forward end being rollingly supported above the ground by a pair of laterally spaced-apart caster wheels for travel as said vehicle moves about and each said trailing conveyor rearward end being positioned above the ground out of contact therewith except through said forward pair of wheels of the immediately rearward one of said trailing conveyors or through said terminal support member;

a plurality of upper hoppers, one being mounted to said first conveyor at said first conveyor rearward end and one being mounted to each of said trailing conveyors at said trailing conveyor rearward end, said upper hopper of said first conveyor being positioned to receive material transported on said first conveyor and said upper hopper of each of said trailing conveyors being positioned to receive material transported on said trailing conveyor to which mounted, each of said upper hoppers including a first housing portion with a fully enclosing sidewall, and a first forwardly facing receiving opening formed in said sidewall into which the corresponding one of said first conveyor or said trailing conveyor to which mounted extends to deposit the material being transported thereon within said first housing portion, a deflector deflecting downward the material received through said first receiving opening, a first funnel receiver portion receiving the downwardly deflected material from said deflector, and a funnel throat portion extending downwardly and receiving the material from said funnel receiver portion, said funnel throat portion terminating in a first exit opening through which the material entering said first receiving opening exits from said first housing portion; and a plurality of lower hoppers, one being mounted to each of said trailing conveyors at said trailing conveyor forward end and one being mounted to said terminal support member, said lower hopper of said trailing conveyors and said terminal support member being positioned below said upper hopper of the immediately forward one of said conveyor or trailing conveyors to receive material from said upper hopper, each of said lower hoppers supporting the corresponding one of said upper hoppers positioned thereabove, with the corresponding one of said upper hoppers being rotatable through a generally horizontal plane and rotatable through a generally vertical plane relative to said lower hopper, each of said lower hoppers including a second funnel receiver portion receiving therewithin said funnel throat portion of said upper hopper positioned thereabove to receive the material exiting from said first exit opening, and a second exit opening through which the material received by said second funnel receiver portion exits from said lower hopper and is deposited onto the corresponding one of said trailing conveyors to which mounted for transport rearward along said trailing conveyor to the one of said upper hoppers mounted to the immediately rearward one of said trailing conveyor or at the distant location.

17. The flexible feeder conveyor system of claim 16 wherein each of said upper hoppers has an annular support portion with a pair of pivot pins attached thereto, and an annular bearing member positioned coaxial with said support portion and between said support portion and said first housing portion with one bearing ring attached to said support portion, another bearing ring attached to said first housing, and bearings positioned between said bearing rings to rotatably support said first housing by said support portion for rotation relative thereto through said generally horizontal plane, and wherein each of said lower hoppers has a pair of upwardly open slots sized to loosely receive a corresponding pair of said pivot pins therein of said upper hopper positioned thereabove for rotation of said upper hopper relative to said lower hopper through said generally vertical plane.

18. A flexible feeder conveyor system for removing material and transporting the removed material to a distant location, comprising:

a mobile vehicle;

a material handling member attached to said vehicle to move the material toward the forward end of said vehicle;

a conveyor carried by said vehicle for travel therewith, said carried conveyor having a forward end at a forward end of said vehicle and a rearward end, said carried conveyor forward end being positioned to receive the material being moved using said material handling member, said carried conveyor moving the material received on said carried conveyor forward end to said carried conveyor rearward end;

a string of at least two trailing conveyors extending from said rearward end of said carried conveyor, said string of trailing conveyors including a first trailing conveyor and a second trailing conveyor, each extending at an upper incline from a forward end to an elevated rearward end, each of said first and second trailing conveyor forward ends being rollingly supported by at least one wheel for travel as said vehicle moves about;

an upper hopper mounted to said first trailing conveyor at said first trailing conveyor rearward end, said upper hopper being positioned to receive material transported on said first trailing conveyor, said upper hopper having a receiving opening into which said first trailing conveyor deposits the material being transported thereon; and a lower hopper mounted to said second trailing conveyor at said second trailing conveyor forward end, said lower hopper being positioned below said upper hopper to receive material from said upper hopper, said lower hopper supporting said upper hopper positioned thereabove for rotation of said upper hopper relative to said lower hopper through both a generally horizontal plane and a generally vertical plane, said lower hopper having an exit opening through which the material received from said upper hopper exits from said lower hopper and is deposited onto said second trailing conveyor for transport rearward along said second trailing conveyor toward the distant location.

19. The feeder conveyor system of claim 18 wherein said upper and lower hoppers are interconnected to transmit the towing force of said vehicle from said first trailing conveyor to said second trailing conveyor during towing of said string of trailing conveyors behind said carried conveyor as said vehicle moves about.

20. The feeder conveyor system of claim 18 wherein said upper hopper has an annular support portion with a pair of pivot pins attached thereto, with said pivot pins extending outward from opposing sides thereof, and a first housing portion rotatably supported by said support portion for rotation relative thereto through said generally horizontal plane, and said lower hopper has a pair of pin receivers to pivotally receive said pair of pins for rotation of said support portion relative to said lower hopper through said generally vertical plane.

21. The feeder conveyor system of claim 20 wherein said first housing portion is rotatably supported by said support portion through a gimbal ring, said gimbal ring being pivotally connected to said support portion for rotation of said gimbal ring relative to said support portion through a vertical plane oriented generally transverse to said vertical plane through which said support portion rotates relative to said lower hopper.

22. A flexible feeder conveyor system for removing material and transporting the removed material to a distant location, comprising:
   a mobile vehicle;
   a material handling member attached to said vehicle to move the material toward the forward end of said vehicle;
   a conveyor carried by said vehicle for travel therewith, said carried conveyor having a forward end at a forward end of said vehicle and a rearward end, said carried conveyor moving material received thereon to said carried conveyor rearward end;
   a conveyor loader attached to said carried conveyor forward end to receive the material being moved using said material handling member, said conveyor loader depositing the material received therein on said carried conveyor forward end for transport to said carried conveyor rearward end;
   a string of at least two trailing conveyors extending from said rearward end of said carried conveyor, said string of trailing conveyors including first and second trailing conveyors, each extending at an upper incline from a forward end to an elevated rearward end, each of said first and second trailing conveyor forward ends being rollingly supported by at least one wheel for travel as said vehicle moves about; and
   a transition hopper connecting said first trailing conveyor to said second trailing conveyor, said transition hopper having an upper hopper mounted above and secured to a lower hopper, said upper hopper being mounted to said first trailing conveyor at said first trailing conveyor rearward end and said lower hopper being mounted to said second trailing conveyor at said second trailing conveyor forward end, said upper hopper being positioned to receive material transported on said first trailing conveyor, said upper hopper having a support portion with a central aperture and a pair of pivot pins attached thereto, with said pivot pins extending outward from opposing sides thereof, and a first housing portion rotatably supported by said support portion for rotation relative thereto through a generally horizontal plane, said first housing portion including a first receiving opening into which said first trailing conveyor deposits the material being transported thereon, and a first receiver portion extending downwardly within said central aperture of said support portion and receiving the material received through said receiver opening, said first receiver portion terminating in a first exit opening through which the material entering said first receiving opening exits from said first housing portion, said lower hopper having a second housing portion and a pair of pin receivers supported by said second housing portion, with said pin receivers being located at opposing sides of said second housing portion to each pivotally receive one of said pivot pins for rotation of said upper hopper relative to said lower hopper through a generally vertical plane, said second housing portion including a second receiver portion receiving the material exiting from said first exit opening of said first receiver portion, and a second exit opening through which the material received by said second receiver portion exits from said second housing portion and is deposited on said second trailing conveyor for transport rearward along said second trailing conveyor toward the distant location, the interconnection of said upper and lower hoppers through said pivot pins and said pin receivers transmitting the towing force of said vehicle from said first trailing conveyor to said second trailing conveyor during towing of said string of trailing conveyors behind said carried conveyor as said vehicle moves about.

23. A flexible feeder conveyor system for removing material from a stockpile and transporting the removed material to a fixed conveyor, comprising:
   a loading hopper to receive the material being removed;
   a terminal support member positioned stationary at the fixed conveyor;
   a string of at least two movable conveyors extendable between the stockpile and said terminal support member, each said movable conveyor extending at an upper incline from a forward end to an elevated rearward end, each said movable conveyor forward end being rollingly supported by at least one wheel for travel as said movable conveyors are moved about, said loading hopper being attached to a forwardmost one of said movable conveyors in said string of movable conveyors and positioned to deposit the material received therein on said forwardmost movable conveyor for transport to the fixed conveyor;
   a plurality of upper hoppers, one being mounted to each of said movable conveyors at said movable conveyor rearward end, said upper hopper of each of said movable conveyors being positioned to receive material transported on said movable conveyor to which mounted, each of said upper hoppers having an annular support portion with a pair of pivot pins attached thereto, with said pivot pins extending outward from opposing sides thereof, and a first housing portion rotatably supported by said support portion for rotation relative thereto through a generally horizontal plane, said first housing portion including a first receiving opening into which the corresponding one of said movable conveyor to which mounted extends to deposit the material being transported thereon within said first housing portion, a deflector deflecting downward the material received through said first receiving opening, a first funnel receiver portion receiving the downwardly deflected material from said deflector, and a funnel throat portion extending downwardly within said support portion and receiving the material from said funnel receiver portion, said funnel throat portion terminating in a first exit opening through which the material entering said first receiving opening exits from said housing portion; and a plurality of lower hoppers, one being mounted to each of said movable conveyors in said string after said forwardmost movable conveyor at said movable conveyor forward end and one being mounted to said terminal support member at a position above the fixed conveyor, said lower hopper of said movable conveyors and said terminal support member being positioned below said upper hopper of the immediately forward one of said movable conveyors to receive material from said upper hopper, each of said lower hoppers having a second housing portion, and a pair of pin receivers supported by said second housing portion, with said receivers being located at opposing sides of said second housing portion to pivotally receive a corresponding one of said pivot pins of said upper hopper positioned thereabove for rotation of said upper hopper relative to said lower hopper through a generally vertical plane, said second housing portion including a second funnel receiver portion receiving therewithin said funnel throat portion of said upper hopper positioned thereabove to receive the material exiting from said first exit opening, and a second exit opening through which the material received by said second funnel receiver portion exits from said second housing portion and is deposited onto the corresponding one of said movable conveyors to which mounted for transport rearward along said movable conveyor to the one of said upper hoppers mounted to the immediately rearward one of said movable conveyor or onto the fixed conveyor, the interconnection of the corresponding ones of said upper and lower hoppers transmitting a towing force applied to said forwardmost movable conveyor through said string of movable conveyors to tow said string of movable conveyors behind said forwardmost movable conveyor with a rearwardmost one of said movable conveyors anchored to said terminal support member.

24. The feeder conveyor system of claim 23, wherein said pin receivers each include a selectively removable retainer pin which, when in place, locks one of said pivot pins within said pin receiver to prevent removal therefrom during usage of the feeder conveyor system.

25. The feeder conveyor system of claim 23, wherein said deflector is selectively adjustable to control the direction of flow of the material engaging said deflector.

26. The feeder conveyor system of claim 23, wherein said pin receivers are upwardly open slots formed in said second housing portion, each sized to loosely receive one of said pivot pins therein to permit said pivot pins to rotate within said slots.

27. The feeder conveyor system of claim 26, wherein said slots are substantially vertically oriented.

28. The feeder conveyor system of claim 23, wherein said loading hopper is attached to said forwardmost movable conveyor at said forward end thereof.

29. A flexible feeder conveyor system for removing material and transporting the removed material to a distant location, comprising:

a conveyor loader to receive the material being removed;

a terminal support member positioned stationary at the distant location where the removed material is to be deposited;

a string of at least two movable conveyors extendable between the material being removed and said terminal support member, each said movable conveyor extending at an upper incline from a forward end to an elevated rearward end, each said movable conveyor forward end being rollingly supported above the ground by a pair of laterally spaced-apart caster wheels for travel as said movable conveyors are moved about and each said movable conveyor rearward end being positioned above the ground out of contact therewith except through said forward pair of wheels of the immediately rearward one of said trailing conveyors or through said terminal support member, said conveyor loader being attached to a forwardmost one of said movable conveyors in said string of movable conveyors at said forward end thereof and positioned to deposit the material received therein on said forwardmost movable conveyor for transport to the distant location;

a plurality of upper hoppers, one being mounted to each of said movable conveyors at said movable conveyor rearward end, said upper hopper of each of said movable conveyors being positioned to receive material transported on said movable conveyor to which mounted, each of said upper hoppers having an annular support portion positioned on a generally upward-oriented rotation axis with a pair of pivot pins attached to said support portion, with said pivot pins extending outward from opposing sides thereof along a laterally oriented pivot axis, a first housing portion with a fully enclosing sidewall and a top closing said sidewall from above, and an annular bearing member positioned coaxial with said support portion about said rotation axis and between said support portion and said first housing portion with one bearing ring attached to said support portion, another bearing ring attached to said first housing, and bearings positioned between said bearing rings to rotatably support said first housing by said support portion for rotation relative thereto through a generally horizontal plane about said axis, said first housing portion including a first forwardly facing receiving opening formed in said sidewall into which the corresponding one of said movable conveyor to which mounted extends to deposit the material being transported thereon within said first housing portion, a deflector deflecting downward the material received through said first receiving opening, a first funnel receiver portion receiving the downwardly deflected material from said deflector, and a funnel throat portion extending downwardly within both said annular bearing and said support portion and receiving the material from said funnel receiver portion, said funnel throat portion terminating in a first exit opening through which the material entering said first receiving opening exits from said first housing portion; and a plurality of lower hoppers, one being mounted to each of said movable conveyors in said string after said forwardmost movable conveyor at said movable conveyor forward end and one being mounted to said terminal support member, said lower hopper of said movable conveyors and said terminal support member being positioned below said upper hopper of the immediately forward one of said movable conveyors to receive material from said upper hopper, each of said lower hoppers having a second housing portion, and a pair of upwardly open slots formed in said second housing portion, with said slots being located at opposing sides of said second housing portion along said pivot axis and sized to loosely receive a corresponding one of said pivot pins therein of said upper hopper positioned thereabove for rotation of said upper hopper relative to said lower hopper through a generally vertical plane about said pivot axis, said second housing portion including a second funnel receiver portion receiving therewithin said funnel throat portion of said upper hopper positioned thereabove to receive the material exiting from said first exit opening, and a second exit opening through which the material received by said second funnel receiver portion exits from said second housing portion and is deposited onto the corresponding one of said movable conveyors to which mounted for transport rearward along said movable conveyor to the one of said upper hoppers mounted to the immediately rearward one of said movable conveyor or at the distant location, the interconnection of the corresponding ones of said upper and lower hoppers transmitting a towing force applied to said forwardmost movable conveyor through said string of movable conveyors to tow said string of movable conveyors behind said forwardmost movable conveyor.

30. A flexible feeder conveyor system for removing material and transporting the removed material to a distant location, comprising:

a terminal support member positioned at the distant location where the removed material is to be deposited;

a string of at least two movable conveyors extendable between the material being removed and said terminal support member, each said movable conveyor extending at an upper incline from a forward end to an elevated rearward end, each said movable conveyor forward end being rollingly supported by at least one wheel for travel as said movable conveyors are moved about, a forwardmost one of said movable conveyors in said string of movable conveyors being positionable to receive the material being removed thereon;

a plurality of upper hoppers, one being mounted to each of said movable conveyors at said movable conveyor rearward end, said upper hopper of each of said movable conveyors being positioned to receive material transported on said movable conveyor to which mounted, each of said upper hoppers having an annular support portion with a pair of pivot pins attached thereto, with said pivot pins extending outward from opposing sides thereof, and a first housing portion rotatably supported by said support portion for rotation relative thereto through a generally horizontal plane, said first housing portion including a first receiving opening into which the corresponding one of said movable conveyor to which mounted extends to deposit the material being transported thereon within said first housing portion, a deflector deflecting downward the material received through said first receiving opening, a first funnel receiver portion receiving the downwardly deflected material from said deflector, and a funnel throat portion extending downwardly within said support portion and receiving the material from said funnel receiver portion, said funnel throat portion terminating in a first exit opening through which the material entering said first receiving opening exits from said first housing portion; and a plurality of lower hoppers, one being mounted to each of said movable conveyors in said string after said forwardmost movable conveyor at said movable conveyor forward end and one being mounted to said terminal support member, said lower hopper of said movable conveyors and said terminal support member being positioned below said upper hopper of the immediately forward one of said movable conveyors to receive material from said upper hopper, each of said lower hoppers having a second housing portion, and a pair of receivers supported by said second housing portion, with said receivers being located at opposing sides of said second housing portion to pivotally receive a corresponding one of said pivot pins of said upper hopper positioned thereabove for rotation of said upper hopper relative to said lower hopper through a generally vertical plane, said second housing portion including a second funnel receiver portion receiving therewithin said funnel throat portion of said upper hopper positioned thereabove to receive the material exiting from said first exit opening, and a second exit opening through which the material received by said second funnel receiver portion exits from said second housing portion and is deposited onto the corresponding one of said movable conveyors to which mounted for transport rearward along said movable conveyor to the one of said upper hoppers mounted to the immediately rearward one of said movable conveyor or at the distant location, the interconnection of the corresponding ones of said upper and lower hoppers transmitting a towing force applied to said forwardmost movable conveyor through said string of movable conveyors to move said string of movable conveyors behind said forwardmost movable conveyor.

31. A flexible feeder conveyor system for removing material and transporting the removed material to a distant location, comprising:

a conveyor loader to receive the material being removed;

a terminal support member positioned at the distant location where the removed material is to be deposited;

a string of at least two movable conveyors extendable between the material being removed and said terminal support member, each said movable conveyor extending at an upper incline from a forward end to an elevated rearward end, each said movable conveyor forward end being rollingly supported by at least one wheel for travel as said movable conveyors are moved about, said conveyor loader being attached to a forwardmost one of said movable conveyors in said string of movable conveyors and being positioned to deposit the material received therein on said forwardmost movable conveyor for transport to the distant location; and a plurality of transition hoppers, one connecting together each of said movable conveyors to the next rearward one of said movable conveyors, and one connecting a rearwardmost one of said movable conveyors in said string to said terminal support, each said transition hopper having an upper hopper mounted above and secured to a lower hopper, one of said upper hoppers being mounted to each of said movable conveyors in said string after said forwardmost movable conveyor at said movable conveyor rearward end, one of said lower hoppers being mounted to each of said movable conveyors in said string after said forwardmost movable conveyor at said movable conveyor forward end and one being mounted to said terminal support member, said upper hopper of each of said movable conveyors being positioned to receive material transported on said movable conveyor to which mounted, each of said upper hoppers having a support portion with a central aperture and a pair of pivot pins attached thereto, with said pivot pins extending outward from opposing sides thereof, and a first housing portion rotatably supported by said support portion for rotation relative thereto through a generally horizontal plane, said first housing portion including a first receiving opening into which the corresponding one of said first conveyor or said movable conveyor to which mounted deposits the material being transported thereon, and a first receiver portion extending downwardly within said central aperture of said support portion and receiving the material received through said receiver opening, said first receiver portion terminating in a first exit opening through which the material entering said first receiving opening exits from said first housing portion, each of said lower hoppers having a second housing portion and a pair of receivers supported by said second housing portion, with said receivers being located at opposing sides of said second housing portion to pivotally receive a corresponding one of said pivot pines of said upper hopper positioned thereabove for rotation of said upper hopper relative to said lower hopper through a generally vertical plane, said second housing portion including a second receiver portion receiving the material exiting from said first exit opening of said first receiver portion, and a second exit opening through which the material received by said second receiver portion exits from said second housing portion and is deposited on the corresponding one of said movable conveyors to which mounted for transport rearward along said movable conveyor to the one of said upper hoppers mounted to the immediately rearward one of said movable conveyor or at the distant location, the interconnection of the corresponding ones of said upper and lower hoppers transmitting a towing force applied to said forwardmost movable conveyor through said string of movable conveyors to tow said string of movable conveyors behind said forwardmost conveyor.

32. A flexible feeder conveyor system for removing material and transporting the removed material to a fixed conveyor, comprising:

a loading hopper to receive the material being removed;

a terminal support member positioned to remain at the fixed conveyor;

a string of at least two movable conveyors extendable between the material being removed and said terminal support member, each said movable conveyor extending at an upper incline from a forward end to an elevated rearward end, each said movable conveyor forward end being rollingly supported by at least one wheel for travel as said movable conveyors are moved about, said loading hopper being attached to a forwardmost one of said movable conveyors in said string and being positioned to deposit the material received therein on said forwardmost movable conveyor for transport to the fixed conveyor;

a plurality of upper hoppers, one being mounted to each of said movable conveyors at said movable conveyor rearward end, said upper hopper of each of said movable conveyors being positioned to receive material transported on said movable conveyor to which mounted, each of said upper hoppers including a first receiving opening into which the corresponding one of said movable conveyor to which mounted extends to deposit the material being transported thereon within said upper hopper, a first funnel receiver portion receiving the material received through said first receiving opening, and a funnel throat portion extending downwardly and receiving the material from said funnel receiver portion, said funnel throat portion terminating in a first exit opening through which the material entering said first receiving opening exits form said upper hopper; and a plurality of lower hoppers, one being mounted to each of said movable conveyors in said string after said forwardmost movable conveyor at said movable conveyor forward end and one being mounted to said terminal support member at a position above the fixed conveyor, said lower hopper of said movable conveyors and said terminal support member being positioned below said upper hopper of the immediately forward one of said movable conveyors to receive material from said upper hopper, each of said lower hoppers supporting the corresponding one of said upper hoppers positioned thereabove, with the corresponding one of said upper hoppers being rotatable through a generally horizontal plane and rotatable through a generally vertical plane relative to said lower hopper, each of said lower hoppers including a second funnel receiver portion receiving therewithin said funnel throat portion of said upper hopper positioned thereabove to receive the material exiting from said first exit opening, and a second exit opening through which the material received by said second funnel receiver portion exits from said lower hopper and is deposited onto the corresponding one of said movable conveyors to which mounted for transport rearward along said movable conveyor to the one of said upper hoppers mounted to the immediately rearward one of said movable conveyor or onto the fixed conveyor, said string of movable conveyors being connected together for towing with a rearwardmost one of said movable conveyors anchored to said terminal support member.

33. The feeder conveyor system of claim 32, wherein each of said upper hoppers has an annular support portion with a pair of pivot pins attached thereto, and a first housing portion rotatably supported by said support portion for rotation relative thereto through said generally horizontal plane, and wherein each of said lower hoppers has a pair of pin receivers to pivotally receive a corresponding pair of said pivot pins of said upper hopper positioned thereabove for rotation of said upper relative to said lower hopper through said generally vertical plane.

34. The feeder conveyor system of claim 33, wherein said pin receivers are upwardly open slots, each sized to loosely receive one of said pivot pins therein to permit said pivot pins to rotate within said slots.

35. The feeder conveyor system of claim 34, wherein said slots are substantially vertically oriented.

36. The feeder conveyor system of claim 32, further including a selectively adjustable deflector which deflects downward the material received through said first receiving opening into said first funnel receiver portion.

37. The feeder conveyor system of claim 32, wherein said loading hopper is attached to said forwardmost movable conveyor at said forward end thereof.

38. A flexible feeder conveyor system for removing material and transporting the removed material to a distant location, comprising:

a conveyor loader to receive the material being removed;

a terminal support member positioned to remain at the distant location where the removed material is to be deposited;

a string of at least two movable conveyors extendable between the material being removed and said terminal support member, each said movable conveyor extending at an upper incline from a forward end to an elevated rearward end, each said movable conveyor forward end being rollingly supported above the ground by a pair of laterally spaced-apart caster wheels for travel as said movable conveyors are moved about an each said movable conveyor rearward end being positioned above the ground out of contact therewith except through said forward pair of wheels of the immediately rearward one of said movable conveyors or through said terminal support member, said conveyor loader being attached to a forwardmost one of said movable conveyors in said string of movable conveyors and being positioned to deposit the material received therein on said forwardmost movable conveyor for transport to the distant location;

a plurality of upper hoppers, one being mounted to each of said movable conveyors at said movable conveyor rearward end, said upper hopper of each of said movable conveyors being positioned to receive material transported on said movable conveyor to which mounted, each of said upper hoppers including a first housing portion with a fully enclosing sidewall, and a first forwardly facing receiving opening formed in said sidewall into which the corresponding one of said movable conveyor to which mounted extends to deposit the material being transported thereon within said first housing portion, a deflector deflecting downward the material received through said first receiving opening, a first funnel receiver portion receiving the downwardly deflected material from said deflector, and a funnel throat portion extending downwardly and receiving the material from said funnel receiver portion, said funnel throat portion terminating in a first exit opening through which the material entering said first receiving opening exits from said first housing portion; and a plurality of lower hoppers, one being mounted to each of said movable conveyors in said string after said forwardmost movable conveyor at said movable conveyor forward end and one being mounted to said terminal support member, said lower hopper of said movable conveyors and said terminal support member being positioned below said upper hopper of the immediately forward one of said movable conveyors to receive material from said upper hopper, each of said lower hoppers supporting the corresponding one of said upper hoppers positioned thereabove, with the corresponding one of said upper hoppers being rotatable through a generally horizontal plane and rotatable through a generally vertical plane relative to said lower hopper, each of said lower hoppers including a second funnel receiver portion receiving therewithin said funnel throat portion of said upper hopper positioned thereabove to receive the material exiting from said first exit opening, and a second exit opening through which the material received by said second funnel receiver portions exits from said lower hopper and is deposited onto the corresponding one of said movable conveyors to which mounted for transport rearward along said movable conveyor to the one of said upper hoppers mounted to the immediately rearward one of said movable conveyor or at the distant location.

39. The flexible feeder conveyor system of claim 38, wherein each of said upper hoppers has an annular support portion with a pair of pivot pins attached thereto, and an annular bearing member positioned coaxial with said support portion and between said support portion and said first housing portion with one bearing ring attached to said support portion, another bearing ring attached to said first housing, and bearings positioned between said bearing rings to rotatably support said first housing by said support portion for rotation relative thereto through said generally horizontal plane, and wherein each of said lower hoppers has a pair of upwardly open slots sized to loosely receive a corresponding pair of said pivot pins therein of said upper hopper positioned thereabove for rotation of said upper hopper relative to said lower hopper through said generally vertical plane.

40. A flexible feeder conveyor system for removing material and transporting the removed material to a distant location, comprising:

a string of at least two movable conveyors including a first movable conveyor and a second movable conveyor, each extending at an upper incline from a forward end to an elevated rearward end, each of said first and second movable conveyor forward end being rollingly supported by at least one wheel for travel as said movable conveyors are moved about;

an upper hopper mounted to said first movable conveyor at said first movable conveyor rearward end, said upper hopper being positioned to receive material transported on said first movable conveyor, said upper hopper having a receiving opening into which said first movable conveyor deposits the material being transported thereon; and a lower hopper mounted to said second movable conveyor at said second movable conveyor forward end, said lower hopper being positioned below said upper hopper to receive material from said upper hopper, said lower hopper supporting said upper hopper positioned thereabove for rotation of said upper hopper relative to said lower hopper through both a generally horizontal plane and a generally vertical plane, said lower hopper having an exit opening through which the material received from said upper hopper exits from said lower hopper and is deposited onto said second movable conveyor for transport rearward along said second movable conveyor toward the distant location.

41. The feeder conveyor system of claim 40, wherein said upper and lower hoppers are interconnected to transmit a towing force applied to said first movable conveyor to said second movable conveyor during movement of said string of movable conveyors.

42. The feeder conveyor system of claim 40, wherein said upper hopper has an annular support portion with a pair of pivot pins attached thereto, with said pivot pins extending outward from opposing sides thereof, and a first housing portion rotatably supported by said support portion for rotation relative thereto through said generally horizontal plane, and said lower hopper has a pair of pine receivers to pivotally receive said pair of pins for rotation of said support portion relative to said lower hopper through said generally vertical plane.

43. The feeder conveyor system of claim 42, wherein said first housing portion is rotatably supported by said support portion through a gimbal ring, said gimbal ring being pivotally connected to said support portion for rotation of said gimbal ring relative to said support portion through a vertical plane oriented generally transverse to said vertical plane through which said support portion rotates relative to said lower hopper.

44. A flexible feeder conveyor system for removing material and transporting the removed material to a distant location, comprising:

a string of at least two movable conveyors including first and second movable conveyors, each extending at an upper incline from a forward end to an elevated rearward end, each of said first and second movable conveyor forward ends being rollingly supported by at least one wheel for travel as said movable conveyors are moved about; and a transition hopper connecting said first movable conveyor said second movable conveyor, said transition hopper having an upper hopper mounted above and secured to a lower hopper, said upper hopper being mounted to said first movable conveyor at said first movable conveyor rearward end and said lower hopper being mounted to said second movable conveyor at said second movable conveyor forward end, said upper hopper being positioned to receive material transported on said first movable conveyor, said upper hopper having a support portion with a central aperture and a pair of pivot pins attached thereto, with said pivot pins extending outward from opposing sides thereof, and a first housing portion rotatably supported by said support portion for rotation relative thereto through a generally horizontal plane, said first housing portion including a first receiving opening into which said first movable conveyor deposits the material being transported thereon, and a first receiver portion extending downwardly within said central aperture of said support portion and receiving the material received through said receiver opening, said first receiver portion terminating in a first exit opening through which the material entering said first receiving opening exits from said first housing portion, said lower hopper having a second housing portion and a pair of pin receivers supported by said second housing portion, with said pin receivers being located at opposing sides of said second housing portion to each pivotally receive one of said pivot pins for rotation of said upper hopper relative to said lower hopper through a generally vertical plane, said second housing portion including a second receiver portion receiving the material exiting from said first exit opening of said first receiver portion, and a second exit opening through which the material received by said second receiver portion exits from said second housing portion and is deposited on said second movable conveyor for transport rearward along said second movable conveyor toward the distant location, the interconnection of said upper and lower hoppers through said pivot pins and said pin receivers transmitting a towing force applied to said first movable conveyor to said second movable conveyor during movement of said string of movable conveyors.

45. The feeder conveyor system of claim 18 wherein said upper and lower hoppers are interconnected to transmit the towing force of said vehicle from said first trailing conveyor to said second trailing conveyor during towing of said string of trailing conveyors behind said carried conveyor as said vehicle moves about, and wherein said upper hopper has an annular support portion and a first housing portion rotatably supported by said support portion for rotation relative thereto through said generally horizontal plane, and said lower hopper is pivotally connected to said support portion for rotation of said support portion relative to said lower hopper through said generally vertical plane, said first housing portion being rotatably supported by said support portion through a gimbal ring, said gimbal ring being pivotally connected to said support portion for rotation of said gimbal ring relative to said support portion through a vertical plane oriented generally transverse to said vertical plane through which said support portion rotates relative to said lower hopper.

46. The feeder conveyor system of claim 45 wherein said annular support portion of said upper hopper has a pair of pivot pins attached thereto, with said pivot pins extending outward from opposing sides thereof, and said lower hopper has a pair of pin receivers to pivotally receive said pair of pins for rotation of said support portion relative to said lower hopper through said generally vertical plane.

47. The feeder conveyor system of claim 40 wherein said upper and lower hoppers are interconnected to transmit a towing force applied to said first movable conveyor to said second movable conveyor during movement of said string of movable conveyors, and wherein said upper hopper has an annular support portion and a first housing portion rotatably supported by said support portion for rotation relative thereto through said generally horizontal plane, and said lower hopper is pivotally connected to said support portion for rotation of said support portion relative to said lower hopper through said generally vertical plane, said first housing portion being rotatably supported by said support portion through a gimbal ring, said gimbal ring being pivotally connected to said support portion through a vertical plane oriented generally transverse to said vertical plane through which said support rotates relative to said lower hopper.

48. The feeder conveyor system of claim 47 wherein said annular support portion of said upper portion has a pair of pivot pins attached thereto, with said pivot pins extending outward from opposing sides thereof, and said lower hopper has a pair of pin receivers to pivotally receive said pair of pins for rotation of said support portion relative to said lower hopper through said generally vertical plane.

* * * * *

UNITED STATES PATENT AND TRADEMARK OFFICE
CERTIFICATE OF CORRECTION

PATENT NO.   :   5,234,094

DATED        :   August 10, 1993

INVENTOR(S)  :   Gary L. Weyermann and Don Suverkrop

It is certified that error appears in the above-identified patent and that said Letters Patent is hereby corrected as shown below:

In column 25, claim 23, line 6, between "said" and "housing portion", please insert --first--.

In column 29, claim 31, line 41, please delete "pines" and substitute therefor --pins--.

In column 30, claim 32, line 31, please delete "form" and substitute therefor --from--.

In column 31, claim 38, line 38, please delete "an" and substitute therefor --and--.

In column 33, claim 42, line 26, please delete "pine" and substitute therefor --pin--.

In column 33, claim 44, lines 47-48, between "said first movable conveyor" and "said second movable conveyor", please insert --to--.

In column 35, claim 48, line 6, after "upper", please delete "portion" and substitute therefor --hopper--.

Signed and Sealed this

Twenty-ninth Day of March, 1994

Attest:

BRUCE LEHMAN

*Attesting Officer*     *Commissioner of Patents and Trademarks*